United States Patent [19]
Nakano et al.

[11] Patent Number: 5,956,733
[45] Date of Patent: *Sep. 21, 1999

[54] NETWORK ARCHIVER SYSTEM AND STORAGE MEDIUM STORING PROGRAM TO CONSTRUCT NETWORK ARCHIVER SYSTEM

[75] Inventors: Yasuhiko Nakano; Yoshiyuki Okada, both of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/812,280

[22] Filed: Mar. 6, 1997

[30] Foreign Application Priority Data

Oct. 1, 1996 [JP] Japan ..................... 8-260516

[51] Int. Cl.$^6$ ..................... G06F 17/30
[52] U.S. Cl. ............... 707/204; 707/200; 707/201; 707/203
[58] Field of Search ............. 346/6, 8; 348/6–7; 382/305; 417/53; 395/182, 18, 712; 341/50, 51; 360/78.12, 78.04; 364/238, 478.03; 379/28, 114; 428/212; 710/68; 711/100, 113

[56] References Cited

U.S. PATENT DOCUMENTS

| | | | |
|---|---|---|---|
| 5,212,772 | 5/1993 | Masters | 395/182.18 |
| 5,574,898 | 11/1996 | Leblang | 707/1 |
| 5,602,993 | 2/1997 | Stroemberg | 395/712 |
| 5,649,196 | 7/1997 | Woodhill | 707/201 |
| 5,649,200 | 7/1997 | Leblang | 395/703 |
| 5,668,897 | 9/1997 | Stolfo | 382/283 |
| 5,675,802 | 10/1997 | Allen | 395/703 |
| 5,734,589 | 3/1998 | Kostreski | 348/6 |

*Primary Examiner*—Thomas G. Black
*Assistant Examiner*—Diane D. Mizrahi
*Attorney, Agent, or Firm*—Staas & Halsey

[57] ABSTRACT

In response to a forming request, an archiver forming module compresses a data file on a network and stores into an archiver. In response to a referring request, an archiver referring module reads out the compressed data file from the archiver, reconstructs on the network, and stores the reconstructed data file into the archiver. An archiver managing module concentratedly manages the archiver on the network. An archiver concentration type processing apparatus in a sharing group is set to a host and remaining archiver distribution type processing apparatuses are set to clients. The archiver, archiver forming module, and archiver referring module are arranged in each of the host and the clients. Concentration processes and distribution processes are allowed to mixedly exist on the network.

26 Claims, 42 Drawing Sheets

FIG. 5

| SYSTEM FORM | I | II | III |
|---|---|---|---|
| COMPRESSING/ RECONSTRUCTING PROCESS | DISTRIBUTION | DISTRIBUTION | CONCENTRATION |
| DATA PRESERVATION | DISTRIBUTION | CONCENTRATION | DISTRIBUTION |
| LIST MANAGEMENT | CONCENTRATION | CONCENTRATION | CONCENTRATION |

FIG. 6

| EQUIPMENT<br>SYSTEM | HOST<br>24 | HOST FILE | CLIENT<br>26-1~26-3 | LOCAL FILE |
|---|---|---|---|---|
| SYSTEM FORM I | LIST MANAGEMENT | LIST PRESERVATION | COMPRESSION/<br>RECONSTRUCTION<br>RETRIEVAL/<br>PRESERVATION | DISTRIBUTION ARCHIVER |
| SYSTEM FORM II | LIST MANAGEMENT<br>RETRIEVAL/<br>PRESERVATION | LIST PRESERVATION<br>CONCENTRATION<br>ARCHIVER | COMPRESSION/<br>RECONSTRUCTION | BACKUP |
| SYSTEM FORM III | LIST MANAGEMENT | LIST PRESERVATION<br>COMPRESSION/<br>RECONSTRUCTION | RETRIEVAL/<br>PRESERVATION | DISTRIBUTION ARCHIVER |

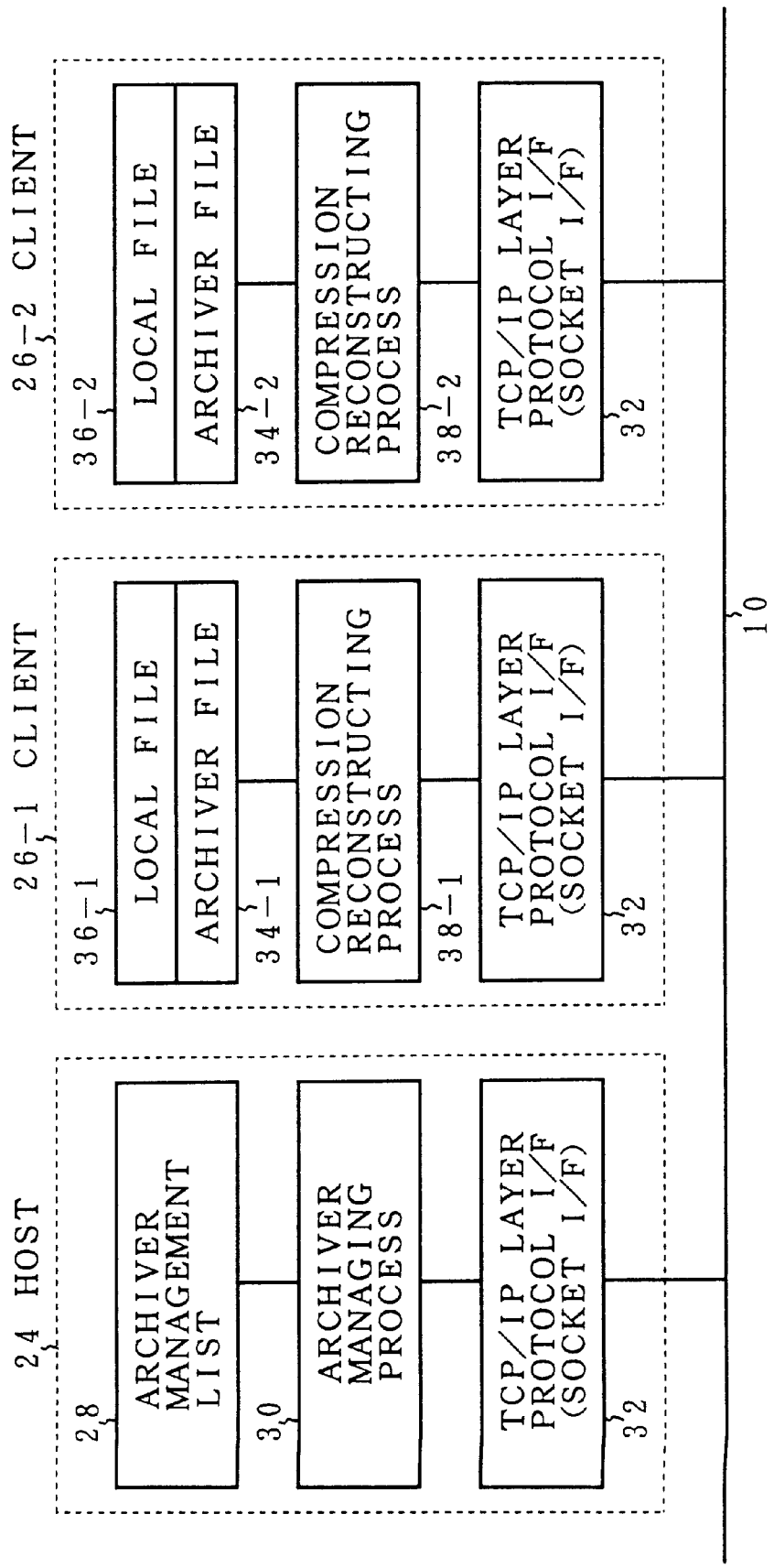

FIG. 10

72 SPECIFICATION LIST

1. MONTHLY REPORT OF A ⎤
2. MONTHLY REPORT OF B ⎥→ THEY ARE REFERRED FROM HOST
3. MONTHLY REPORT OF C ⎦
4. MEMO FOR MONTHLY REPORT OF A ⎤
5. MEMO FOR MONTHLY REPORT OF B ⎥→ THEY ARE OWN INFORMATION
6. MEMO FOR MONTHLY REPORT OF C ⎦
7. COMMON MEMO FOR EACH MEMBER IN GROUP → UNIQUE
8. OWN MEMO → UNIQUE
9. DRAFT OF MONTHLY REPORT OF GROUP → UNIQUE

FIG. 15

REPORT CATALOG OF Y — 44

| FILE NAME | MACHINE NAME | DIRECTORY | SIZE | DATE OF FORMATION | COMPRESSION RATIO |
|---|---|---|---|---|---|
| DOCUMENT CATALOG OF Y | HOST | /home/mreport | 113742 | Jan. 22 19:07 | 46% |
| DOCUMENT CATALOG OF X | B | /home/report | 4321 | Jan. 9 17:23 | 41% |
| Total 2 CATALOGS | | | 118063 | | 43% |

94

NETWORK CONNECTING STATE — 40

HOST  A  B

FIG. 18

REPORT CATALOG OF Y — 44

| FILE NAME | MACHINE NAME | DIRECTORY | SIZE | DATE OF FORMATION | COMPRESSION RATIO |
|---|---|---|---|---|---|
| a | A | /home/tmp | 113742 | Jan. 22 19:07 | 46% |
| b | B | /home/tmp | 4321 | Jan. 9 17:23 | 41% |
| Total 2 CATALOGS | | | 118063 | | 43% |

58

NETWORK CONNECTING STATE — 40

HOST — A — B

| FILE NAME | MACHINE NAME | DIRECTORY | SIZE | DATE OF FORMATION | COMPRESSION RATIO |
|---|---|---|---|---|---|
| a | A | /home/tmp | 113742 | Jan. 22 19:07 | RECONS-TRUCTED |
| b | B | /home/tmp | 4321 | Jan. 9 17:23 | RECONS-TRUCTED 43% |
| Total 2 CATALOGS | | | 118063 | | |

REPORT CATALOG OF Y — 44

58

NETWORK CONNECTING STATE — 40

HOST  A  B

| FILE NAME | MACHINE NAME | DIRECTORY | SIZE | DATE OF FORMATION | COMPRESSION RATIO |
|---|---|---|---|---|---|
| a | HOST | /home/hiko | 113742 | Jan. 22 19:07 | 46% |
| b | HOST | /home/hiko | 4321 | Jan. 9 17:23 | 41% |
| Total 2 CATALOGS | | | 118063 | | 43% |

REPORT CATALOG OF Y — 44

58

NETWORK CONNECTING STATE — 40

REPORT CATALOG OF Y — 44

| FILE NAME | MACHINE NAME | DIRECTORY | SIZE | DATE OF FORMATION | COMPRESSION RATIO |
|---|---|---|---|---|---|
| a | HOST | /home/hiko | 113742 | Jan. 22 19:07 | COMPRESSED |
| b | HOST | /home/hiko | 4321 | Jan. 9 17:23 | COMPRESSED |
| Total 2 CATALOGS | | | 118063 | | 43% |

58

NETWORK CONNECTING STATE — 40
HOST A B

REPORT CATALOG OF Y — 44

| FILE NAME | MACHINE NAME | DIRECTORY | SIZE | DATE OF FORMATION | COMPRESSION RATIO |
|---|---|---|---|---|---|
| a | A | /home/tmp | 113742 | Jan. 22 19:07 | 46% |
| b | B | /home/tmp | 4321 | Jan. 9 17:23 | 41% |
| Total 2 CATALOGS | | | 118063 | | 43% |

58

NETWORK CONNECTING STATE — 40

HOST — A — B

REPORT CATALOG OF Y — 44

| FILE NAME | MACHINE NAME | DIRECTORY | SIZE | DATE OF FORMATION | COMPRESSION RATIO |
|---|---|---|---|---|---|
| a | A | /home/tmp | 113742 | Jan. 22 19:07 | RECONS-TRUCTED |
| b | B | /home/tmp | 4321 | Jan. 9 17:23 | RECONS-TRUCTED |
| Total 2 CATALOGS | | | 118063 | | 43% |

← 58

NETWORK CONNECTING STATE — 40

HOST — A — B

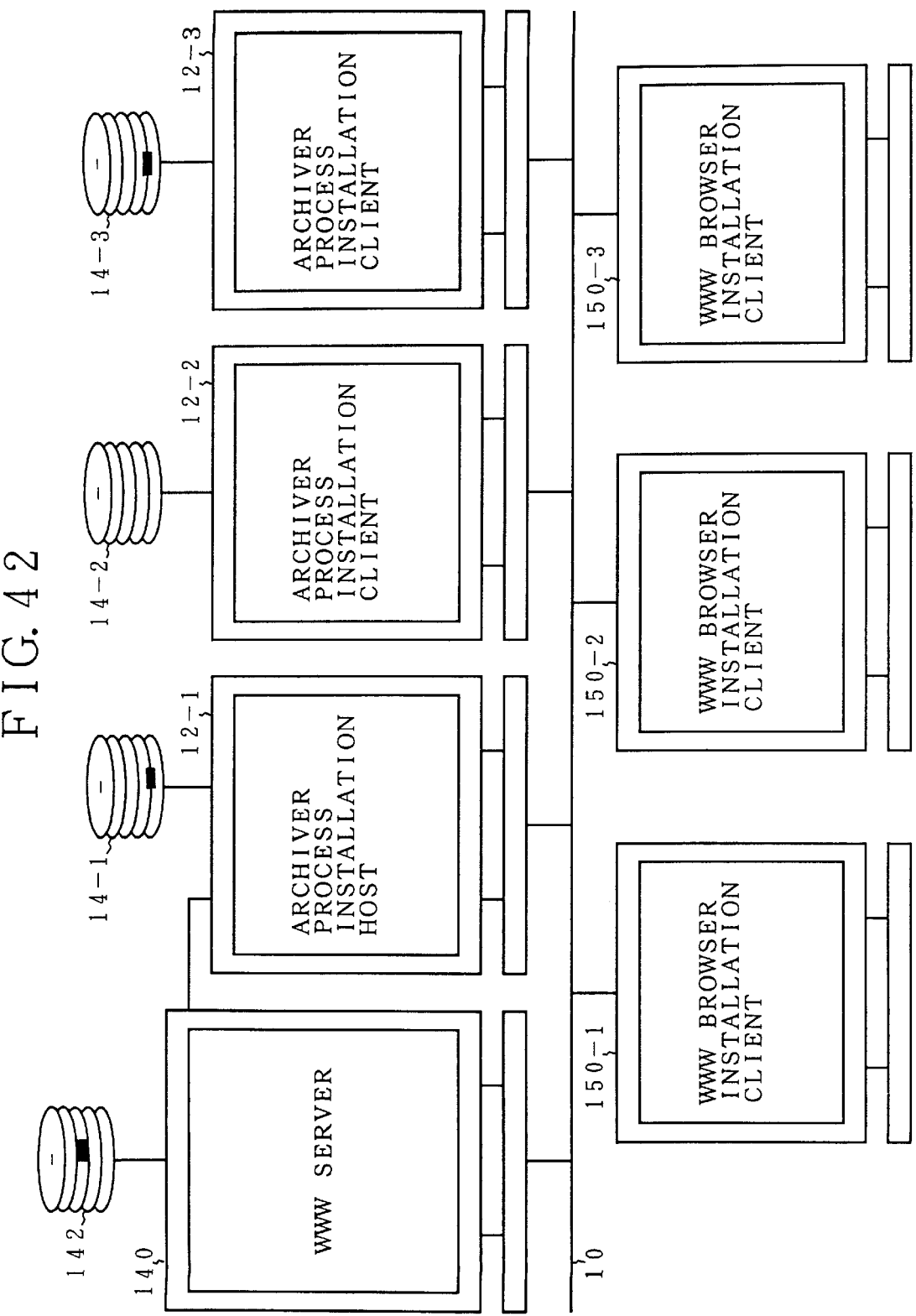

NETWORK ARCHIVER SYSTEM AND STORAGE MEDIUM STORING PROGRAM TO CONSTRUCT NETWORK ARCHIVER SYSTEM

BACKGROUND OF THE INVENTION

The invention relates to a network archiver system for storing a data file into an archiver (library) arranged on a network to which a plurality of computers are connected and referring to such a data file. More particularly, the invention relates to a network archiver system for compressing a data file, storing the compressed data file into an archiver, reconstructing the compression data file, and referring to such a data file, and also relates to a storage medium in which a program to construct the network archiver system has been stored.

In recent years, as a computer network in an enterprise, network functions such as a database process, a transaction process, and electronic mail, and the like have been provided. Since the computer network is ripening and permeating as mentioned above, the number of enterprises and users intending to actively use a sharing of information by using the network is increasing. For example, a working group is arbitrarily formed on the network and useful information, for instance, a data file of a business report such as a weekly report, a monthly report, or the like is transmitted and received among members of the group through the network, thereby efficiently executing the works and improving productivity. On the other hand, electronic information is increasing and an amount of data that is accumulated on the network is very large. Therefore, it will be obviously important in the future that, as various information, data files as a substance are efficiently accumulated, retrieved, and managed on the network.

A groupware in which enterprise users share daily atypical works and a motion such that a database is shared by many and unspecified persons connected to the network by using the Internet, which has recently been realized, are also trials to efficiently use the sharing of information. Although the realization of a network of a computer system in an enterprise is remarkable as mentioned above, actually, the sharing of data cannot be freely accomplished on the network. It is a present situation that information owned by each person is still scattered in each individual computer. Consequently, when the user wants to refer to the data of another person, he copies the data to his own machine through the network and refers to it or executes an additional wiring, a change, or the like and uses again the resultant data. In order to share information, a file server is often provided. However, since a simple file server is not systematically constructed, a management such as addition, updating, deletion, or the like of the file on the server is manually performed, so that it is troublesome.

On the other hand, the groupware is one solution for the enterprise user who desires to realize data sharing. By using the groupware by a working group, the sharing data can be concentratedly managed by one server. Each member can share information by accessing data on the server. For instance, Lotus Corp. (IBM Corp. at present) which is an enterprise as a pioneer of the groupware has already sold two millions or more of groupware products "Notes" in the world. However, there is also a problem in the present groupware. The groupware is inherently means for concentratedly managing the sharing information by one server. Ordinarily, when considering the relation of loads of the server, the number of clients connected to one server is limited to about 100 to 200. When a response of the operation is important, the number of clients decreases more and more. Consequently, the server is divided into a plurality of servers are provided and data to be shared is distributed and arranged.

Problems with respect to the sharing of information on the network will mow be summarized as follows.

(1) Information data is held in a distributed state and is not used.

(2) When the user tries to use the information, the operation is apt to be troublesome.

(3) Even when the groupware or the like is used, there is a limitation for concentration and a distribution of the information inevitably occurs.

Although an approach to realize the data sharing is steadily progressing, in consideration of the present network form in which a concentration and a distribution of information mixedly exist, it is necessary to built a construction in which a load on the network and a load on the server are small and a degree of utilization of sharing data is high.

SUMMARY OF THE INVENTION

According to the invention, there is provided a network archiver system serving as a new construction for efficiently performing data sharing by using data compression while recognizing the present situation in which a repugnance between the distribution and the concentration of information occurs.

As a fundamental concept of the invention, an archiver (library) for storing sharing data is arranged on a network, a data compression to compress a sharing data file and store the sharing data file into the archiver is made to correspond to the network, and further, a functional arrangement regarding the archiver and the data compression is set to a mixture type of the concentration type and distribution type. Archiver management information (database bookmark) to realize a construction such that the contents of the archiver of the mixture type of the concentration and distribution can be easily used again while organically making them correspond to each other on the network is formed and used. That is, the invention relates to a network archiver system in which a sharing group to share data by a plurality of computer apparatuses connected through a network is formed, and a data file formed by each apparatus is stored as a sharing data file into an archiver existing on the network is used.

According to the invention, such a network archiver system has: an archiver forming module for, when a request to form an archiver is received, compressing data in a data file on a computer network and storing the compression data into the archiver; an archiver reference module for, when a request to refer to the archiver is received, reading out the compressed data file from the archiver, reconstructing the file on the network, and storing the resultant file into the archiver; and an archiver managing module for concentratedly managing the archiver on the network. A specific computer apparatus in the sharing group is set to be a host, serving as a concentration type processing apparatus, for performing processes of the concentration type with respect to the archiver. The other remaining apparatuses are set to clients each serving as a distribution type processing apparatus for performing processes of the distribution type with respect to the archiver. Further, the archiver, the archiver forming module, and the archiver reference module are arranged in the host and clients and are allowed to mixedly exist on the network. As a system form in which the concentration type and the distribution type mixedly exist, there are the following three kinds of system forms. It is always assumed that the archiver managing module is of the concentration type by the host.

System form I:
 The archiver is set to the distribution type and compression and reconstruction are also set to the distribution type.

System form II:
 The archiver is set to the concentration type and the compression and reconstruction are set to the distribution type.

System form III:
 The archiver is set to the distribution type and the compression and reconstruction are set to the concentration type.

[System form I]

According to the system form I, the archivers are distributed and arranged to the clients and the compression and reconstruction are also distributed and arranged to the clients. In the system form I, therefore, the archiver managing module is concentratedly arranged to the host and the compression or reconstruction of the data file for the archiver is instructed to the clients. The archiver forming module, archiver reference module, and archivers are distributed and arranged to each client, the compression or reconstruction of the data file by a command from the host is executed and the resultant file is preserved. Describing in more detail, when the archiver forming request is received from the host itself or client, the host retrieves the client holding the archiver in which the corresponding data file has been stored by the retrieval of the archiver management information and generates a compressing command. When the compressing command is received from the host, the client reads out the corresponding data file from the own archiver, compresses the read-out data file, and after that, stores the compressed data file. The client notifies the host of the end of the compression, thereby allowing the host to update the archiver management information into a compressing state. When the archiver reference request is received from the host itself or client, the host retrieves the client holding the archiver in which the corresponding compressed data file has been stored by the retrieval of the archiver management information and generates a reconstructing command. When the reconstructing command is received from the host, the client reads out the corresponding compressed data file from the own archiver, reconstructs the read-out data file, and after that, stores the reconstructed data file into the archiver. The client notifies the host of the end of the reconstruction, thereby allowing the host to update the contents of the archiver management information into a reconstructing state.

[System form II]

According to the system form II, the archivers are concentratedly arranged to the host and the compression and reconstruction are distributed and arranged to the clients. Consequently, in the system form II, the archiver managing module and archivers are concentratedly arranged to the host and the compression and reconstruction of the data file is instructed to the client. The archiver forming module and archiver reference module are distributed and arranged to each client. After the data file was compressed or reconstructed by a command from the host, the data file is transferred to the host and is stored into the archiver. Explaining in more detail, when the archiver forming request is received, the host retrieves the client for compressing the corresponding data file from the archiver management information, generates a compressing command, reads out the corresponding data file from the archiver, and transfers the data file to the client. When the compressing command is received from the host, the client compresses the data file transferred from the host and, after that, transfers the compressed data file to the host, thereby allowing the data file to be stored into the archiver. Further, the client notifies the host of the end of the compression, thereby allowing the host to update the archiver management information into the compressing state. In this case, the client transfers the compressed data file to the host, thereby allowing the data file to be preserved. At the same time, the client can also preserve the data file as a backup file by itself. When the archiver reference request is received, the host retrieves the client to reconstruct the corresponding data file from the archiver management information, generates a reconstructing command, reads out the corresponding compressed data file from the own archiver, and transfers it to the client. When the reconstructing command is received from the host, the client reconstructs the compressed data file transferred from the host. After that, the client transfers the reconstructed data file to the host, allows the data file to be stored into the archiver, and further, notifies the host of the end of the reconstruction, thereby allowing the host to update the archiver management information into the reconstructing state. As for the distribution and reconstruction as well, it is desirable that the client transfers the reconstructed data file to the host, allows the data file to be preserved, and simultaneously, preserves the data file as backup information by itself.

[System form III]

According to the system form III, the archivers are concentratedly arranged to the host and the compression and reconstruction are distributed and arranged to the clients. Therefore, in the system form III, the archiver managing module, archiver forming module, and archiver reference module are concentratedly arranged to the host, thereby concentratedly processing the compression and reconstruction of the data files to the archivers. The archivers are distributed and arranged to each client. Each client compresses the data file transferred from the host, stores it into the archiver, reconstructs the data file, and transfers it. Explaining in more detail, when the archiver forming request is received, the host retrieves the client having the archiver in which the corresponding data file has been stored from the archiver management information and generates a transfer command. When the transfer command is received from the host, the client reads out the corresponding data file from the own archiver and transfers the data file to the host, thereby allowing the data file to be compressed. Further, the host transfers the compressed data file to the client and allows the data file to be stored and also allows the client to update the archiver management information into the compressing state. When the archiver reference request is received, the host retrieves the client holding the archiver in which the corresponding compressed data file has been stored from the archiver management information and generates a transfer command. When receiving the transfer command from the host, the client reads out the corresponding compressed data file from the own archiver, transfers the data file to the host, and allows the data file to be reconstructed. Further, the host transfers the reconstructed data file to the client, allows the data file to be stored, and allows the client to update the archiver management information into the reconstructing state.

As an extension of the system forms I to III, it is also possible to construct in a manner such that in the archiver system of the network, a plurality of groups each having a host and a plurality of clients are provided, the host of each group requests the host of another group to form and refer to the archiver. Further, as an extension of the system forms I to III, a plurality of groups each having a host and a plurality of clients are provided, a general host is further provided as an upper apparatus of the host of each group, thereby requesting to form and refer to the archiver among the plurality of groups. In this instance, the host and clients can be also set with respect to any computer apparatus on the network. The archiver managing module manages a preserving position of the archiver, the presence or absence of the compression, a date of formation, a size, a file name, a directory name, a computer name, and a compression ratio as database bookmarks serving as archiver management information. The archiver management information by the archiver managing module can be transparently referred as same contents by any computer apparatus on the network. The archiver managing module forms and manages hierarchical archiver management information indicative of the addition of personal information into an archiver file. As for the hierarchical archiver management information, link information indicative of the addition of the personal information to the archiver file. Further, when the archivers of a plurality of groups are managed, the archiver managing module can also manage the archivers so that the archiver management information of each group telescopically includes the archiver management information of another group. According to the distribution archiver in the system form, each of the data files is compressed, the archivers physically serving as one large file which were distributed and arranged are allocated in a lump on the network, so that it is convenient to divide information into groups or backup the information. According to the distribution form of the compression and reconstruction, when the archiver is formed and referred to, loads are not concentrated to a specific computer apparatus, so that a response speed of the operation can be raised. Since the data file to be stored into the archiver is compressed, a rate of the data file which occupies in the file on the network is suppressed and a larger amount of sharing resources can be used. On the other hand, with respect to the concentration form of the compression and distribution, for example, when a server having a high processing ability which is used only for a database is used as a host, the compression and reconstruction can be more efficiently performed rather than the case where the distributing process is executed by the client, so that the load on the client side can be reduced by an amount of such an efficient process. Further, as for the development, addition, and deletion of each of the data files stored in the archiver, even if the archivers are distributed on the network, the data file can be transparently used by observing the archiver management information provided as a database bookmark without being conscious of the actual file. Consequently, while the data which was distributed to various places on the network and could not be reused so far is distributed as it is, information can be easily shared. In case of the concentrated management of such as groupware or the like, there is a limitation in the sharing due to the relation of the load on the network or server. However, when the data is compressed and, further, the archivers are distributed, an amount of the data which flows on the networks is decreased by the data sharing, the load on the network or server can be reduced, and a degree of data sharing on the network can be raised.

Further, according to the invention, there is provided a storage medium in which a program to construct a network archiver system in which a sharing group to share data by a plurality of computer apparatuses connected via a network and a data file formed by each apparatus is stored as a sharing data file into an archiver existing on the network and is used has been stored. The program in the storage medium is characterized in that there are provided an archiver forming module for, when receiving a forming request of the archiver, compressing data in the data file on the computer network and storing the compressed data into the archiver, an archiver reference module for, when receiving a reference request of the archiver, reading out the compressed data file from the archiver, reconstructing the read-out data file on the network, and storing the reconstructed data file into the archiver, and an archiver managing module for concentratedly managing the archivers on the network, a specific apparatus in the sharing group is set to a concentration type processing apparatus for performing processes of the concentration type with respect to the archiver, the other remaining apparatuses are set to distribution type processing apparatuses each for performing processes of the distribution type with respect to the archiver, and the archivers, archiver forming modules, and archiver reference modules are arranged to the concentration type processing apparatus and the distribution type processing apparatuses and are allowed to mixedly exist on the network.

The above and other objects, features, and advantages of the present invention will become more apparent from the following detailed description with reference to the drawings.

BRIEF DESCRIPTION OF THE DRAWINGS

FIG. 5 is an explanatory diagram of a system form of the invention;

FIG. 6 is an explanatory diagram of a function concentration and a function distribution in each system form for the sharing group as a target in FIG. 5;

FIG. 7 is a block diagram of system functions to realize a system form I;

FIG. 10 is an explanatory diagram of a specification list of a group formation and a system form in which a monthly report forming work is used as an example;

FIG. 15 is an explanatory diagram of the catalog list formed in accordance with FIG. 14;

FIG. 18 is an explanatory diagram of the updated catalog list after completion of the archiver forming process in FIG. 17;

FIG. 42 is a block diagram of a system construction for a computer network corresponding to the Internet as a target.

DETAILED DESCRIPTION OF THE PREFERRED EMBODIMENTS (Formation of sharing group and system form)

Figure 1:
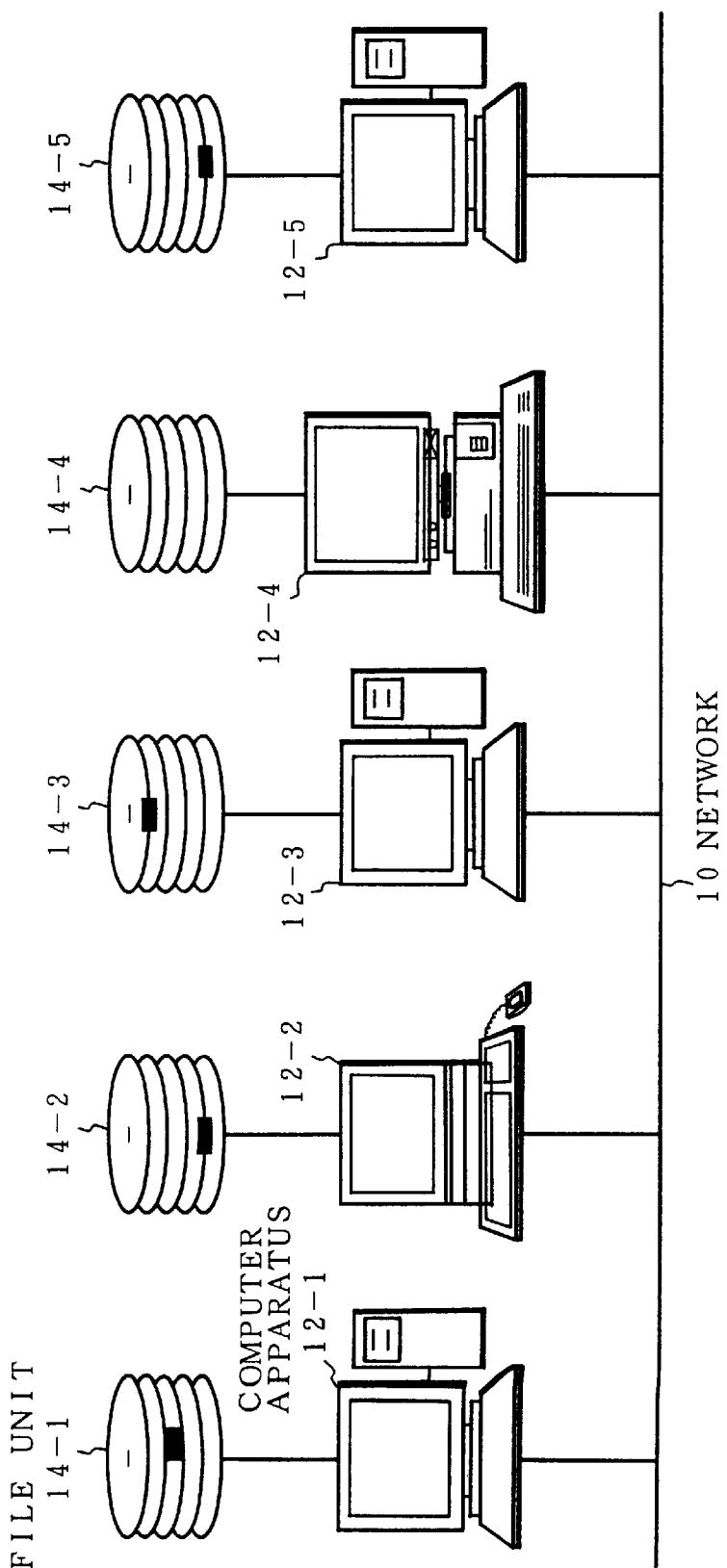
FIG. 1 is an explanatory diagram of a computer network to which the invention is applied.

FIG. 1 is an explanatory diagram of a computer network to which a network archiver system of the invention is applied. As a network 10 in the embodiment, a local area network (LAN) provided in an enterprize is used as an example. For example, computers 12-1, 12-2, . . . , and 12-5 are connected to the network 10. The computers 12-1 to 12-5 have file units 14-1, 14-2, 14-3, 14-4, and 14-5 using magnetic disk drives for recording data on a file unit basis or the like, respectively. In such a computer network in the enterprize, for instance, in case of constructing a groupware, a server client system in which a server function is provided for a specific computer apparatus and the remaining computer apparatuses are set to clients is constructed. A host computer system in which a specific computer apparatus is set to a host and a plurality of computer apparatuses are connected as terminal apparatuses to the host computer can be also constructed together with the server client system. In the network archiver system of the invention, an archiver module serving as software to realize the network archiver system is installed in each of the computer apparatuses 12-1 to 12-5 connected to the network 10 and is set up in a predetermined system form, so that the network archiver system can be constructed.

Figure 2:
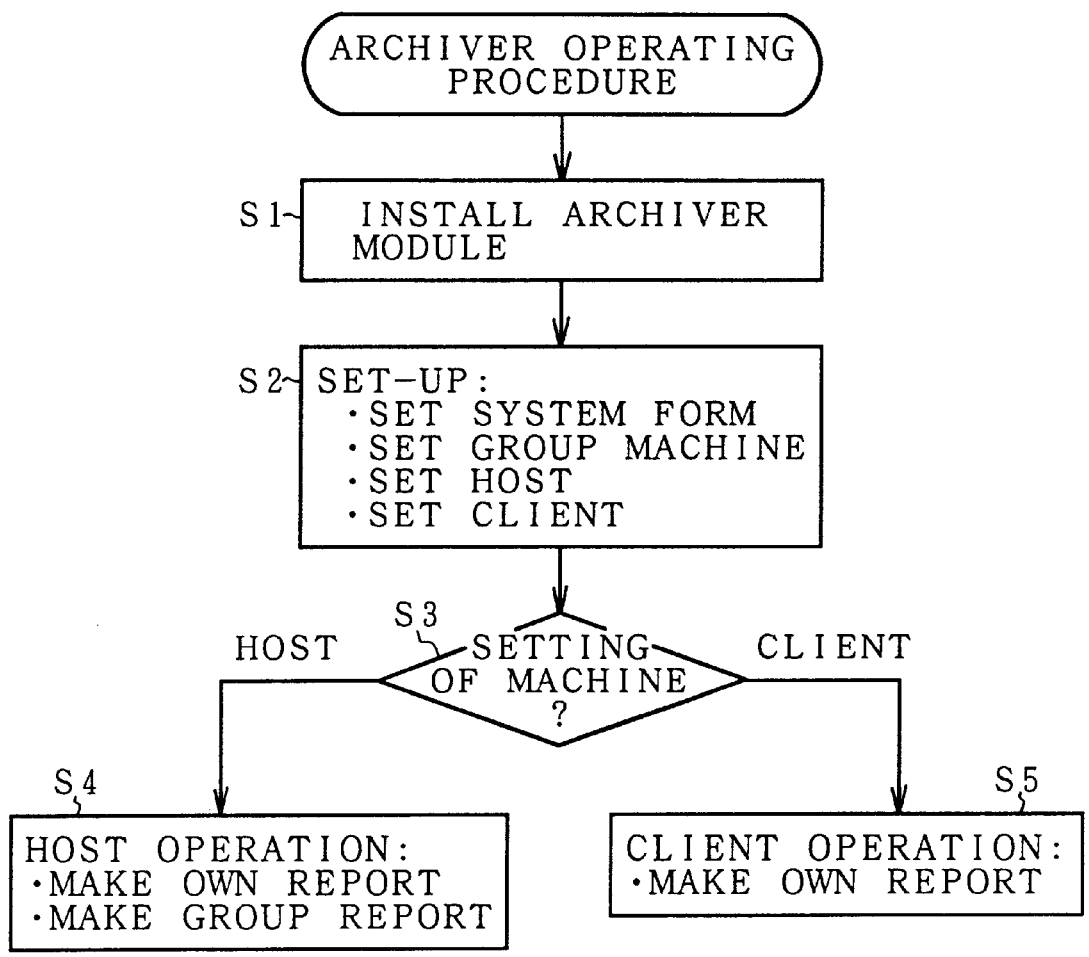
FIG. 2 is a flowchart for a procedure in a range from an installation of an archiver module to the operation for realizing the invention.

FIG. 2 is a flowchart for an operating procedure to construct the network archiver system of the invention for the computer network in FIG. 1 as a target. First in step S1, the archiver module prepared as an application for an FD, an optical disk, further, an on-line program file, or the like is installed to each of the computer apparatuses 12-1 to 12-5 connected to the network 10. The archiver module has functions of FIG. 3.

Figure 3:
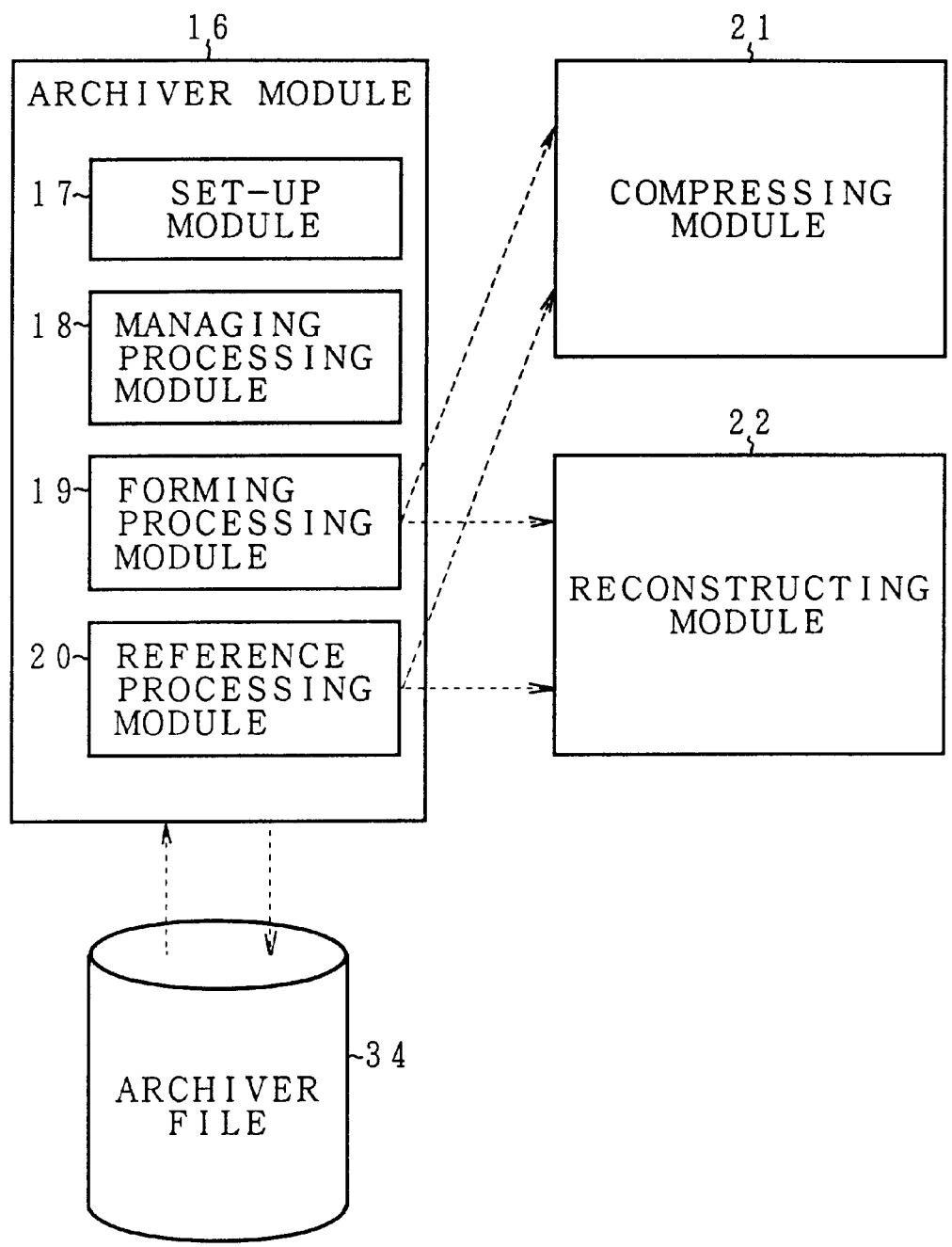
FIG. 3 is an explanatory diagram of an archiver module which is installed in a computer apparatus and is used in the invention.

In FIG. 3, an archiver module 16 is constructed by: a set-up module 17; a managing processing module 18 which functions as an archiver managing unit; a forming processing module 19 which functions as an archiver forming unit; and a reference processing module 20 which functions as an archiver reference unit. Further, in the invention, since the archiver module 16 compresses when file data is accumulated into an archiver file 34 and reconstructs the compressed file data when reading out and referring to it, it is necessary to install a compressing module 21 and a reconstructing module 22 together with the archiver module 16. If the compressing module 21 and reconstructing module 22 have already been prepared as an OS in the computer apparatuses 12-1 to 12-5, they can be used. As an algorithm of the compressing module 21 and reconstructing module 22, since various kinds of data such as character code, vector information, image, and the like are compressed as targets, for example, an arithmetic coding algorithm as a representative of a universal coding can be used. For instance, an LZW (Lempel-Ziv-Welch) algorithm in an LZ (Lempel Ziv) known as a slide dictionary method or the like can be also used. It will be obviously understood that such an algorithm can be also installed as an application.

Referring again to FIG. 2, after the archiver module was installed, step S2 follows. A set-up process for constructing the archiver system is performed. As a set-up process, the following four setting operations are necessary.

I. A setting of a group machine (setting of a sharing group).
II. A setting of a system form (mixture setting of a concentration type and a distribution type).
III. A setting of a host (setting of a concentration type processing apparatus).
IV. A setting of a client (setting of a distribution type processing apparatus).

Figure 4:
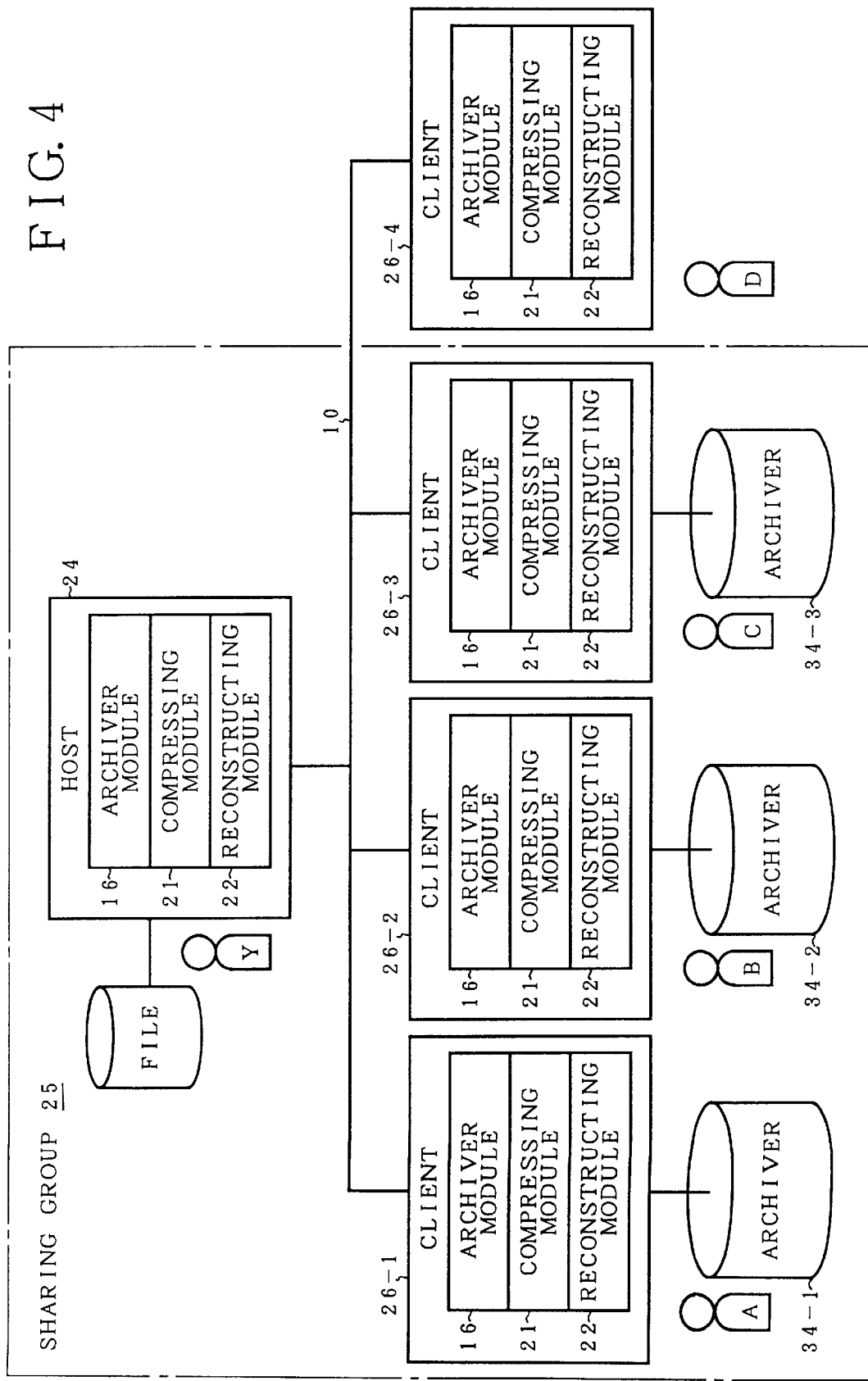
FIG. 4 is an explanatory diagram of a sharing group of the invention.

FIG. 4 shows a state in which the archiver module 16, compressing module 21, and reconstructing module 22 in FIG. 3 have been installed in each of the computer apparatuses 12-1 to 12-5 of the computer network in FIG. 1 and a state in which a sharing group serving as a machine group of the archiver system has been set. It is now assumed that in the computer apparatuses 12-1 to 12-5 of the network 10 in FIG. 1, there are five computer users Y, A, B, C, and D, respectively. In a sharing group 25 of FIG. 4, one working group is constructed by four users Y, A, B, and C. Among them, Y is a leader and the remaining three persons A, B, and C are group constructing members. Further, D doesn't belong to the working group. As shown in FIG. 1, the users Y, A, B, and C included in the sharing group 25 use the computer apparatuses 12-1 to 12-4 and the user D out of the group uses the computer apparatus 12-5. The formation of the sharing group 25 is executed simultaneously with the setting of the host and the setting of the clients. First, the set-up module of the archiver module 16 installed in each apparatus is activated and the machine names of the computer apparatuses 12-1 to 12-4 in FIG. 1 to form the sharing group 25 are inputted. At the same time, the host is set into a specific computer apparatus in the group and the clients are set into the remaining computer apparatuses. In the sharing group 25 in FIG. 4, since the user Y is the leader, the computer apparatus 12-1 is set to the host and the remaining computer apparatuses 12-2 to 12-4 are set to the clients. Thus, in the sharing group 25 in FIG. 4, the user Y uses a host 24 and the remaining users A and B use clients 261, 26-2, and 26-3. Although the existence of the computer apparatus 12-5 of the user D existing outside the sharing group 25 is not conscious in the sharing group 25, since the reference of the archiver as sharing data of the sharing group 25 is open, the computer apparatus 12-5 is positioned to the client 26-4. When the sharing group 25 can be formed with respect to the computer network as mentioned above, a system form is subsequently set in step S2 in FIG. 2.

FIG. 5 shows a schematic diagram of the system form in the archiver system of the invention and any one of the three system forms I, II, and III can be selected. In the network archiver system of the invention, three items of the compression and reconstruction of the data to be stored into the archiver, the position of the archiver to preserve the sharing data, and further the list management to manage the archiver are fundamental items of the system. In the system forms I to III in FIG. 5, in the list management of the archiver, concentration type processes in which all of the hosts are allowed to have the functions are set. On the other hand, as for the compression reconstructing process on the network and the data preservation indicative of the file position where the archiver is provided, either one of the distribution type and the concentration type is selected. In the system form I, the compression reconstructing process is set to the distribution type and the arrangement of the archivers as a data preservation is also set to the distribution type. The distribution type means that the processes are distributed and arranged to the clients of the sharing group. In the system form II, the compression reconstructing process is set to the distribution type and the arrangement of the archivers serving as a data preservation is set to the concentration type in which it is provided for the host. Further, in the system form III, the compression reconstructing process is set to the concentration type in which it is provided for the host and the arrangement of the archivers serving as a data preservation is set to the distribution type in which they are arranged to the clients.

FIG. 6 shows system functions of the host 24 and clients 26-1 to 26-3 to which the system forms I, II, and III of FIG. 5 are applied with regard to the sharing group 25 in FIG. 4. Namely, in the system form I, the host 24 manages the archiver management list and the archiver management list is preserved in the host file. In this instance, a compression reconstructing function is provided for each of the clients 26-1 to 26-3 and the distribution archiver is arranged to the local files constructed by the file units connected to the clients 26-1 to 26-3. Further, a retrieving and preserving function for reading out and storing the data file from/into the distribution archiver is provided for each of the clients 26-1 to 26-3. The system form II is the same as the system form I with respect to the list management of the host 24 and the archiver is set to the concentration type. Therefore, in addition to the management list, the concentration archiver is arranged to the host file. In association with it, the retrieving and preserving function for the concentration archiver is provided. On the other hand, a compression reconstructing function is distributed and arranged on the side of the clients 26-1 to 26-3. Further, the local file can be used as a backup. In the system form III, the host 24 is provided with the compression reconstructing function of the data file as a concentration type in addition to the list management. Only the management list is preserved in the host file. On the side of the clients 26-1 to 26-3, since the distribution archiver is arranged to the local file, the retrieving and preserving function of the data file for the distribution archiver is arranged. The setting of the system forms I to III in the sharing group 25 in FIG. 4 can be realized by selectively validating the functions of the archiver module 16, compressing module 21, and reconstructing module 22 installed in each of the host 24 and the clients 26-1 to 26-3. For example, in the system form I, the function of the managing processing module 18 in FIG. 3 in the archiver module 16 of the host 24 is validated. In the clients 26-1 to 26-3, it is sufficient to validate the functions of the forming processing module 19 and reference processing module 20 in FIG. 3 in the archiver module 16, and further, the compressing module 21 and reconstructing module 22. Thus, the arrangement of the archivers on the network in the sharing group 25 is set to the arrangement of distribution archivers 34-1 to 34-3 distributed to the clients 26-1 to 26-3. As for the arrangement of the distribution archivers 34-1 to 34-3, the same shall also apply to the system form III. On the other hand, in the system form II, since the concentration archiver is set, only the file unit of the host 24 is arranged as an archiver 34 for the network 10. Any one of the system forms I to III can be properly selected in accordance with the work contents in the sharing group. For example, when each computer apparatus of the sharing group 25 has the same ability, it is desirable to use the system form I in order to distribute the load. On the other hand, when the computer apparatus in which the host 24 has been set is a powerful machine, the concentration archiver type or the concentration, compression, and reconstruction of the system form II or III can be used. Further, when there is a limitation of a file capacity on the host side, the distribution archiver of the system form III is desirable. Each of the system forms I, II, and III will now be described in detail hereinbelow.

(Distribution compression and reconstruction and the system form of distribution archiver)

FIG. 7 is a functional block diagram of the archiver system of the invention having the system form I in FIGS. 5 and 6 and relates to the case, as an example, where a group is formed by two clients 26-1 and 26-2 for the host 24 as a sharing group. In the system form I, the archivers are distributed to the clients 26-1 and 26-2, they are also distributed to the clients 26-1 and 26-2 with respect to the compression and reconstruction, and in the host 24, only the list management of the archiver is executed. Therefore, an archiver managing process 30 and an archiver management list 28 are provided for the host 24. Compression reconstructing processes 38-1 and 38-2, archiver files 34-1 and 34-2, and local files 36-1 and 36-2 are provided for each of the clients 26-1 and 26-2. The archiver files 34-1 and 34-2 and the local files 36-1 and 36-2 are provided on the file unit side of the compression reconstructing processes 38-1 and 38-2, respectively. A TCP/IP layer protocol interface 32 is provided as an interface for the network 10 of the host 24 and clients 26-1 and 26-2. For example, a socket interface can be used.

Figure 8:
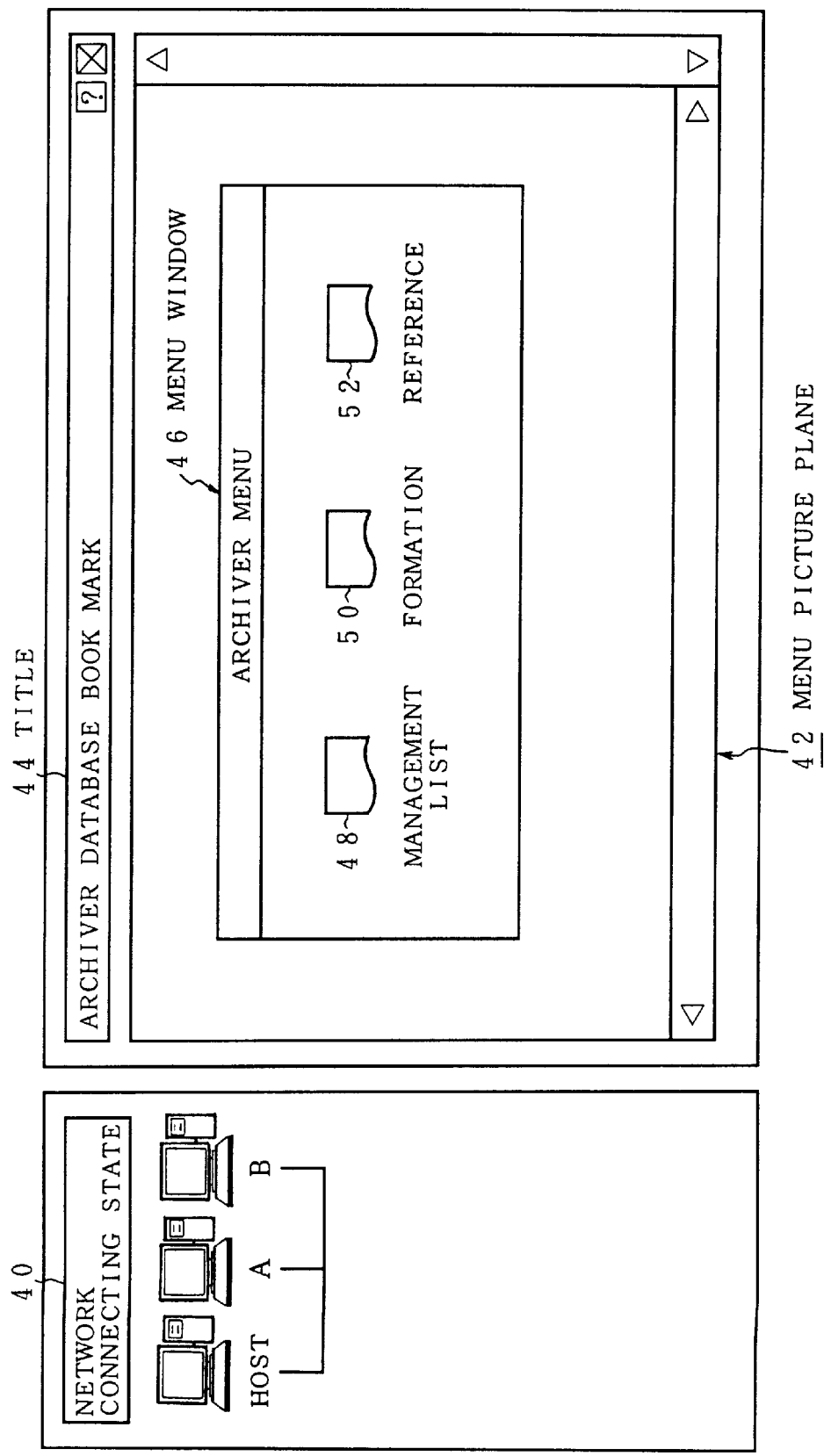
FIG. 8 is an explanatory diagram of an initial picture plane of archiver management information which is used in the system of FIG. 7.

FIG. 8 is an explanatory diagram of a menu picture plane 42 when the archiver network system of the invention in the host 24 and clients 26-1 and 26-2 in FIG. 7 is applied. A network connecting state 40 constructing the sharing group, a title 44 of "Archiver database bookmark" as a name of archiver management information, and further, a menu window 46 are displayed on the menu picture plane 42. An icon 48 for the management list, an icon 50 for formation, and an icon 52 for reference are displayed in the menu window 46. In the menu picture plane 42, if the user wants to refer to the contents of the archiver management list, it is sufficient to click the icon 48 for the management list by a mouse. When it is intended to store a data file, for example, a document data file serving as working contents which are formed by the sharing group into the archiver on the network, it is sufficient to click the icon 50 for formation by the mouse. Further, when it is intended to read out a data file of the archiver itself existing on the network or another group constructing member from such an archiver, it is sufficient to click the icon 52 for reference by the mouse. Further, from graphic contents of the network connecting state 40, it will be understood that the sharing group is constructed by host machines A and B.

Figure 9:
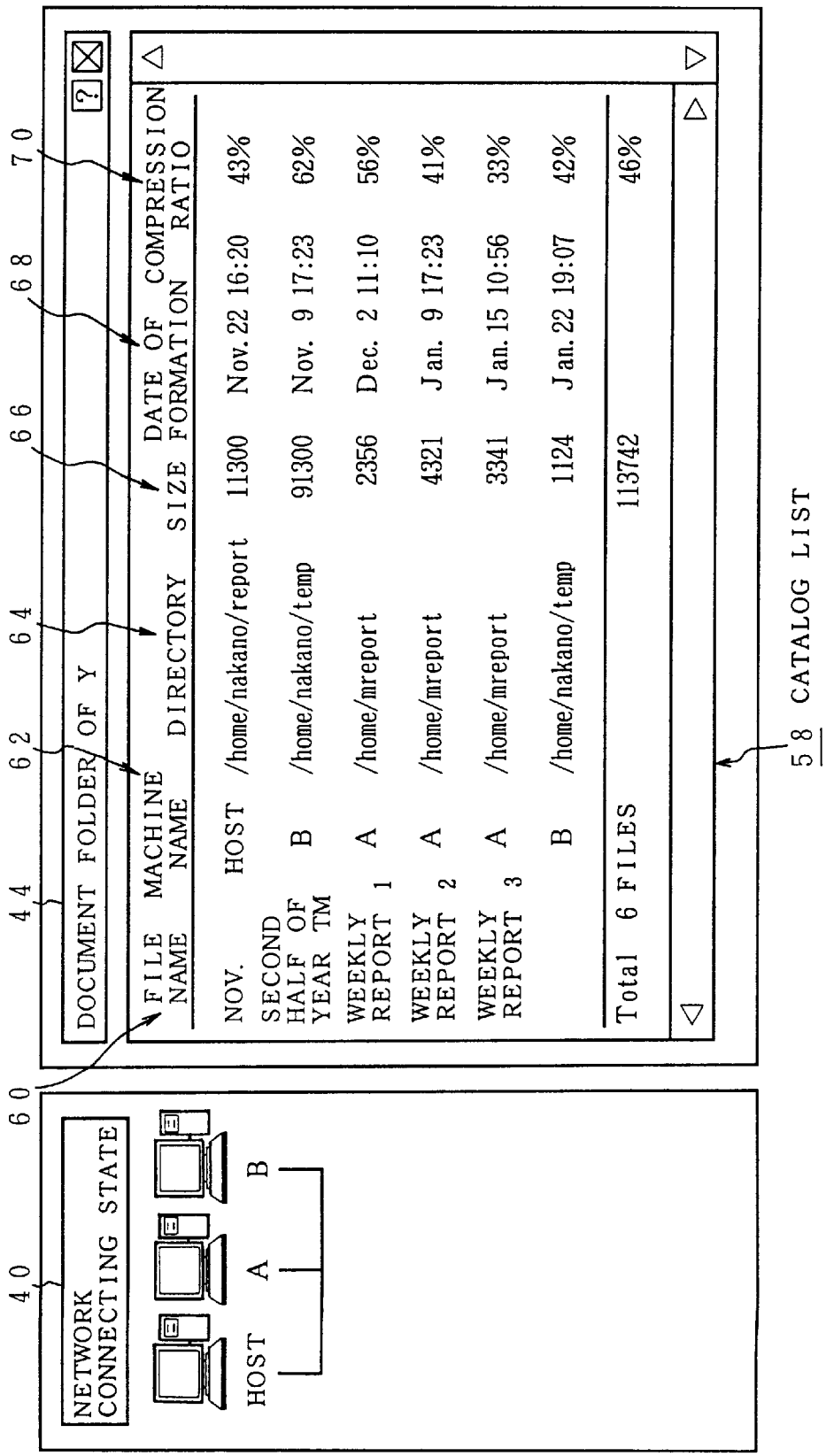
FIG. 9 is an explanatory diagram of a catalog list which is obtained by a selection of a formation in the initial picture plane of FIG. 8.

FIG. 9 is an explanatory diagram of a picture plane of a catalog list 58 based on an archiver management file when the icon 50 for formation was clicked by the mouse in the menu picture plane 42 in FIG. 8. In the catalog list 58, the network connecting state 40 is simultaneously displayed. A message indicative of a document holder of the leader Y of the sharing group 25 shown in FIG. 4 is shown in the portion of the title 44 of the catalog list 58. Subsequently, as catalog contents, a file name 60, a machine name 62, a directory 64 of the archiver serving as a file storage destination, a size 66 of data file shown by the number of bytes, a date of formation 68, and further, a compression ratio 70 are provided. In the example, a case of forming a weekly report by the sharing group is shown. As a catalog list 58, a further another form can be used. For instance, in case of executing a certain specific work in the group, division, or the like constructing the sharing group, there is a case where it is intended to add his own comment or the like to a data file of somebody other than himself and to treat the resultant data file as a series of file sets, namely, archivers.

FIG. 10 shows an example of a specification list 72 when constructing an archiver system in such a working group. For example, in the case where the group leader Y looks at monthly reports of the group constructing members A, B, and C and forms a group monthly report, a file such as a specification list 72 in FIG. 10 is necessary. In order to treat the data file such as a specification list 72 by the archiver system of the invention, it is sufficient to further expand the catalog list 58 shown in FIG. 9 and to form a hierarchical catalog list as shown in FIG. 11 or 12.

Figure 11:
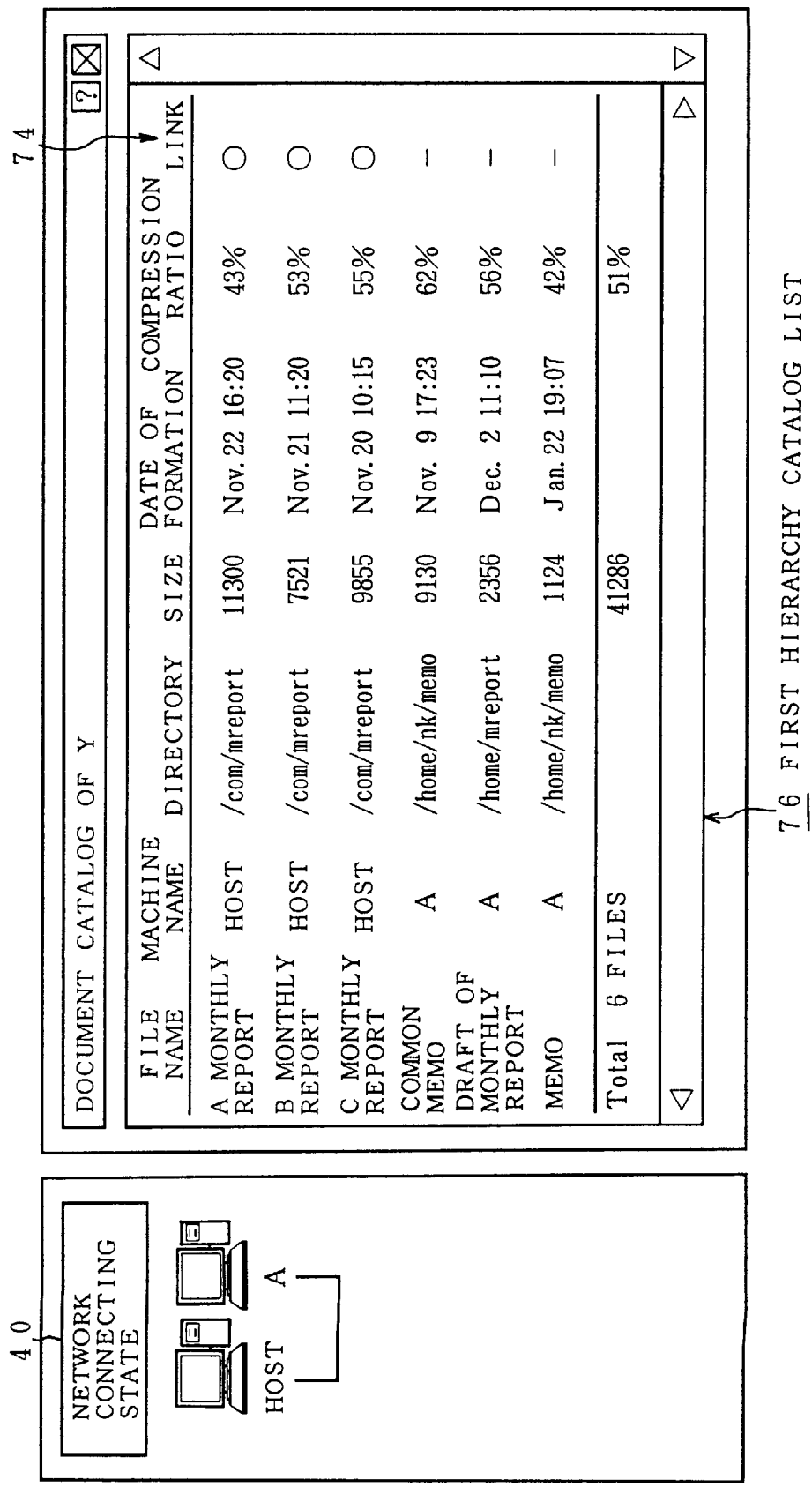
FIG. 11 is an explanatory diagram of a catalog list having a hierarchical structure with link information which is used in a system constructed in accordance with the specification list of FIG. 10.
Figure 12:
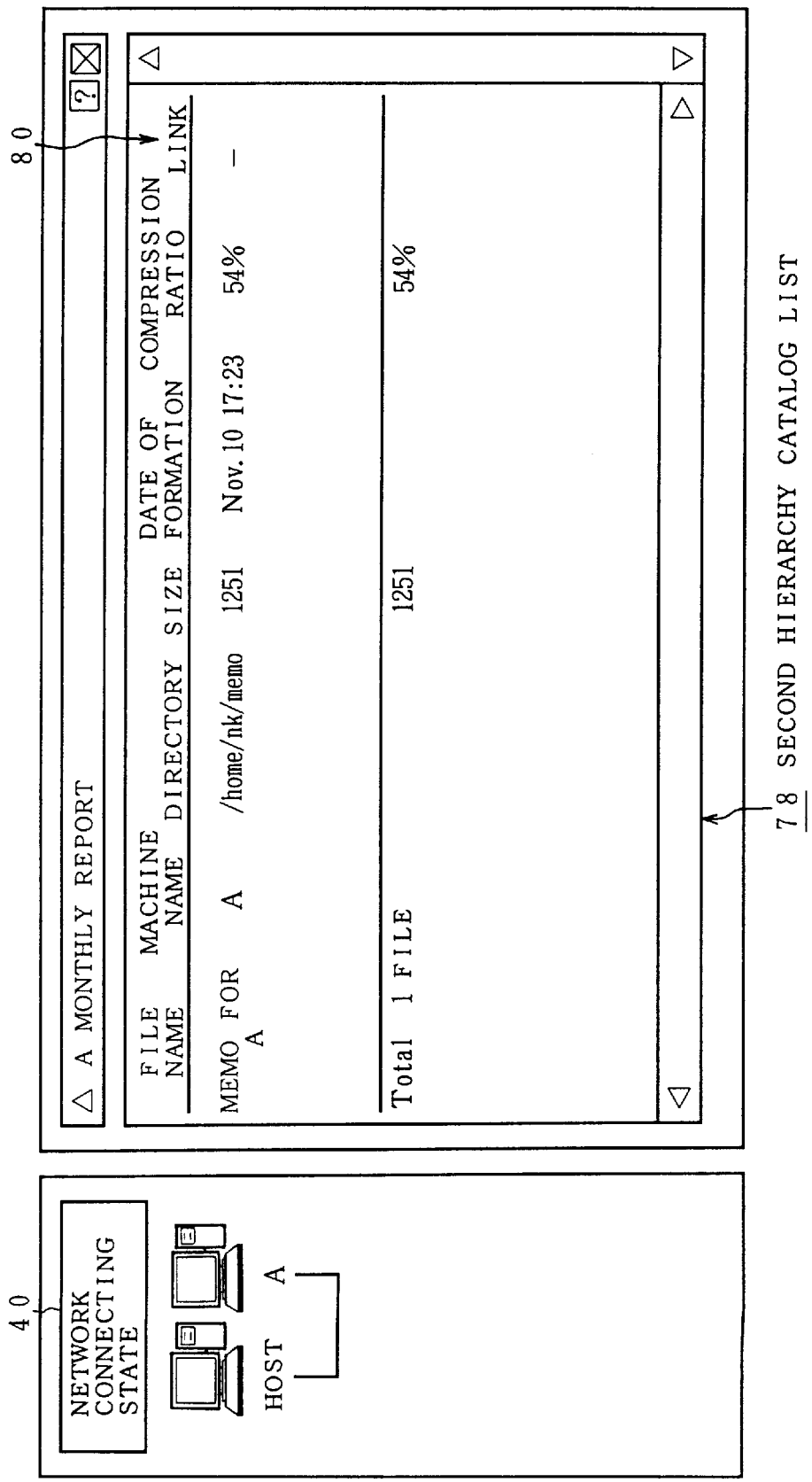
FIG. 12 is an explanatory diagram of a lower catalog list linked the catalog list of FIG. 11.
Figure 13:
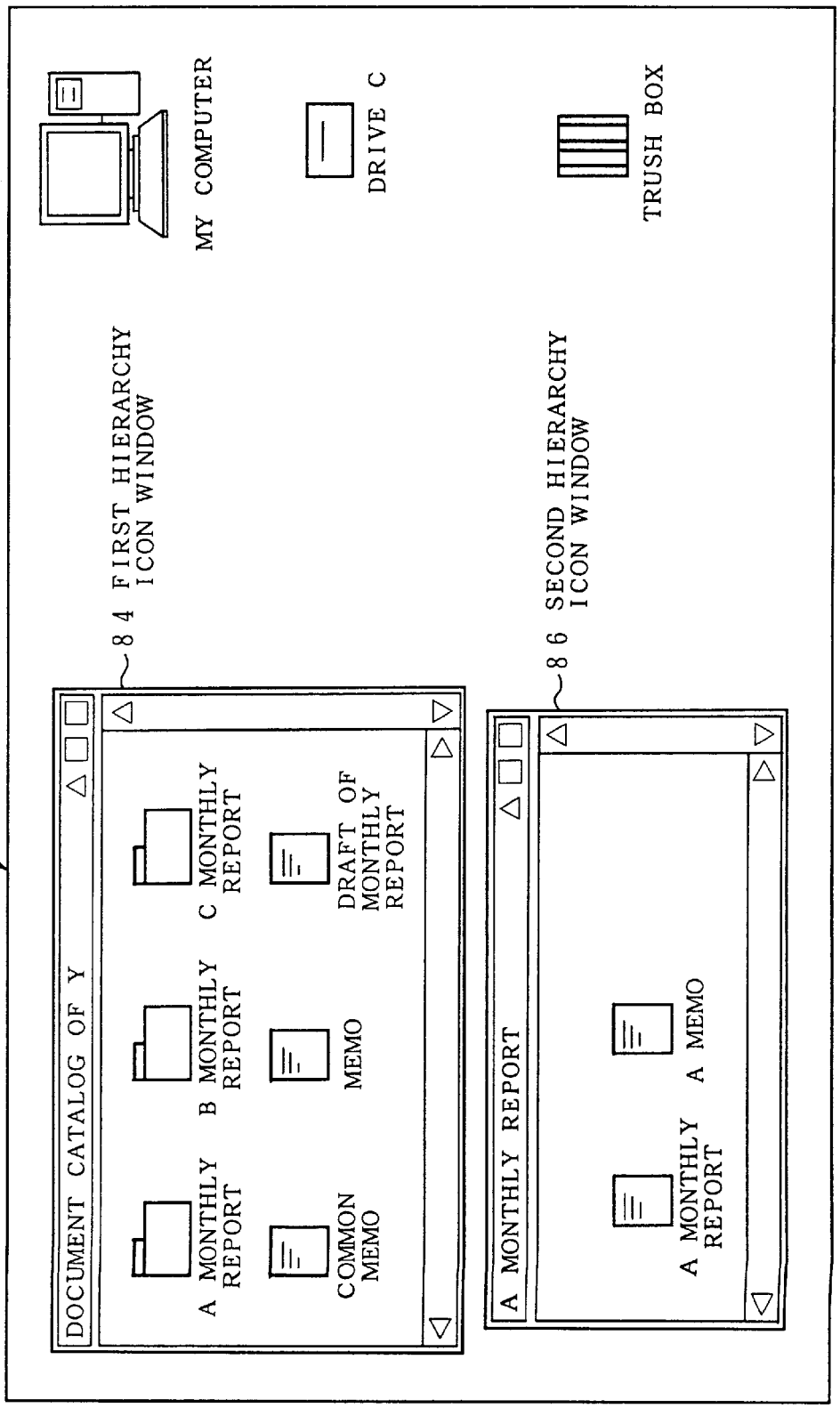
FIG. 13 is an explanatory diagram in which the catalog lists of FIGS. 11 and 12 are shown as icons.
Figure 14:
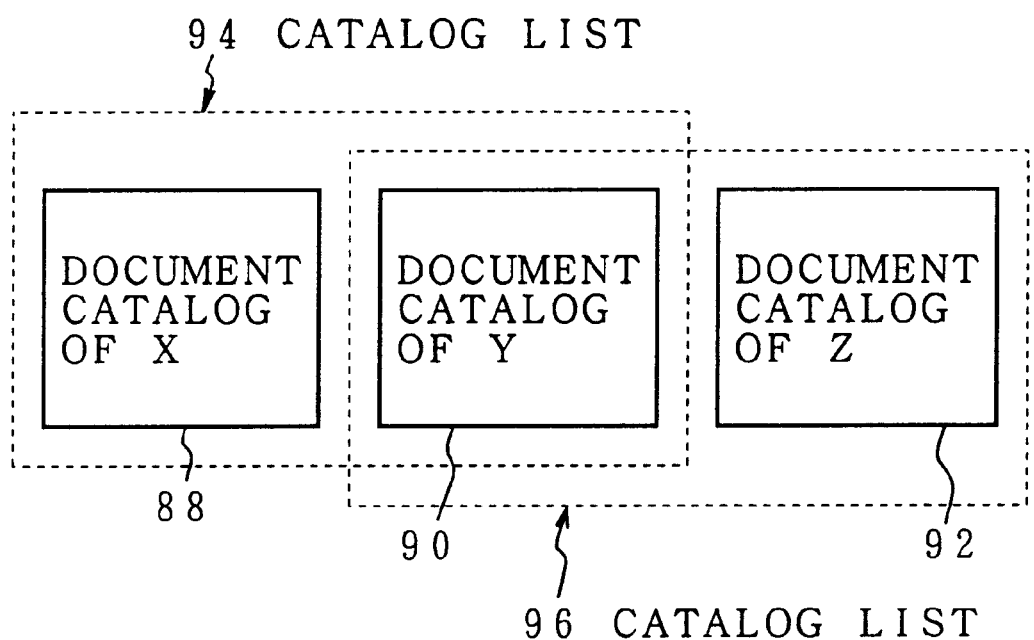
FIG. 14 is an explanatory diagram in which a plurality of groups of catalogs are set to a catalog list in an overlapping manner.

FIG. 11 shows a first hierarchy catalog list 76. Although it is fundamentally similar to the catalog list 58 of FIG. 9, a link 74 indicative of the presence or absence of attribute information for a file is provided as a flag at the end of the catalog list 76. For example, in "A monthly report" of the first line in FIG. 11, a flag indicative of the presence of the attribute information has been set in the link 74. By clicking the link 74 by the mouse, the leader Y can see, for example, a second hierarchy catalog list 78 as shown in FIG. 12. The second hierarchy catalog list 78 shows that a file name "Memo for A" has been stored as attribute information of the file name "A monthly report" of the first hierarchy catalog list 76 in FIG. 11. The catalog list as such an archiver management list can be further easily used by expressing it in a holder form using an icon as shown in FIG. 13. In an icon catalog list 82 in FIG. 13, the contents of the first hierarchy catalog list 76 in FIG. 11 are shown by a first hierarchy icon window 84 and the contents of the second hierarchy catalog list 78 in FIG. 12 are shown by a second hierarchy icon window 86. Further, a plurality of catalogs can be telescopically managed as a catalog list. FIG. 14 shows document catalogs 88, 90, and 92 of leaders X, Y, and Z constructing a working group. With respect to such a plurality of document catalogs, for example, a catalog list 94 includes the document catalog 88 of X and the document catalog 90 of Y. A catalog list 96 includes the document catalog 90 of Y and the document catalog 92 of Z.

FIG. 15 is an explanatory diagram of a picture plane of the catalog list 94 in the case where the document catalog 90 of Y is selected with respect to the catalog list 94 in FIG. 14. In this case, simultaneously with a catalog name "Document catalog of Y" indicative of "Report catalog of Y" in the title 44, "Document catalog of X" is telescopically displayed in the catalog list 94. With respect to the catalog list serving as a management list in the archiver system of the invention as mentioned above, they are stored into the archiver management list 28 of the host 24 in FIG. 7 and are concentratedly managed.

On the other hand, as for the personal catalog by the link 74 or the like in FIG. 11 and the use catalog by the database bookmark such as a memo or the like, it is sufficient to individually manage them by each computer apparatus. That is, the host 24 in FIG. 7 executes the archiver managing process 30 as a server for the archiver management list 28. In the archiver system of the invention, in each user of the host 24 and clients 26-1 and 26-2 constructing the sharing group, the user can construct his own virtual database by only a phantom alias (shadow) such as a database bookmark that is realized by the archiver management list 28 which is managed like a server on the host 24 side. That is, when the sharing data is treated, the substance of the data is not copied but the alias (shadow) is used. The alias is something to link with the substance of the data and, in the invention, it is the archiver management list serving as a catalog list that is provided as a database bookmark. Ordinarily, when it is intended to give the set of data files to somebody, there is a case where the substance of the data is copied and sent. On the other hand, in the archiver system of the invention, the database bookmark as a set of catalog lists as archiver management information is used, the operations for copying and transferring the data are not executed, but by moving only the database bookmark as a set of aliases, each person can access to the data substance. Thus, a data movement amount between the apparatuses of the sharing group can be minimized. Further, the database bookmark constructed by a set of aliases as database management information or a mixture of the alias and the data substance is transparent from any one of the computer apparatuses. By minimally restricting the copy of the data substance, the duplex of the data file is suppressed and an unnecessary increase in data accumulation amount on the network is prevented. Thus, the accumulation amount of the sharing data is increased and a use degree can be raised. Further, in the invention, when the data file serving as a data substance has to be moved on the network, a data compression is used as much as possible and the transfer data amount is reduced.

Figure 16:
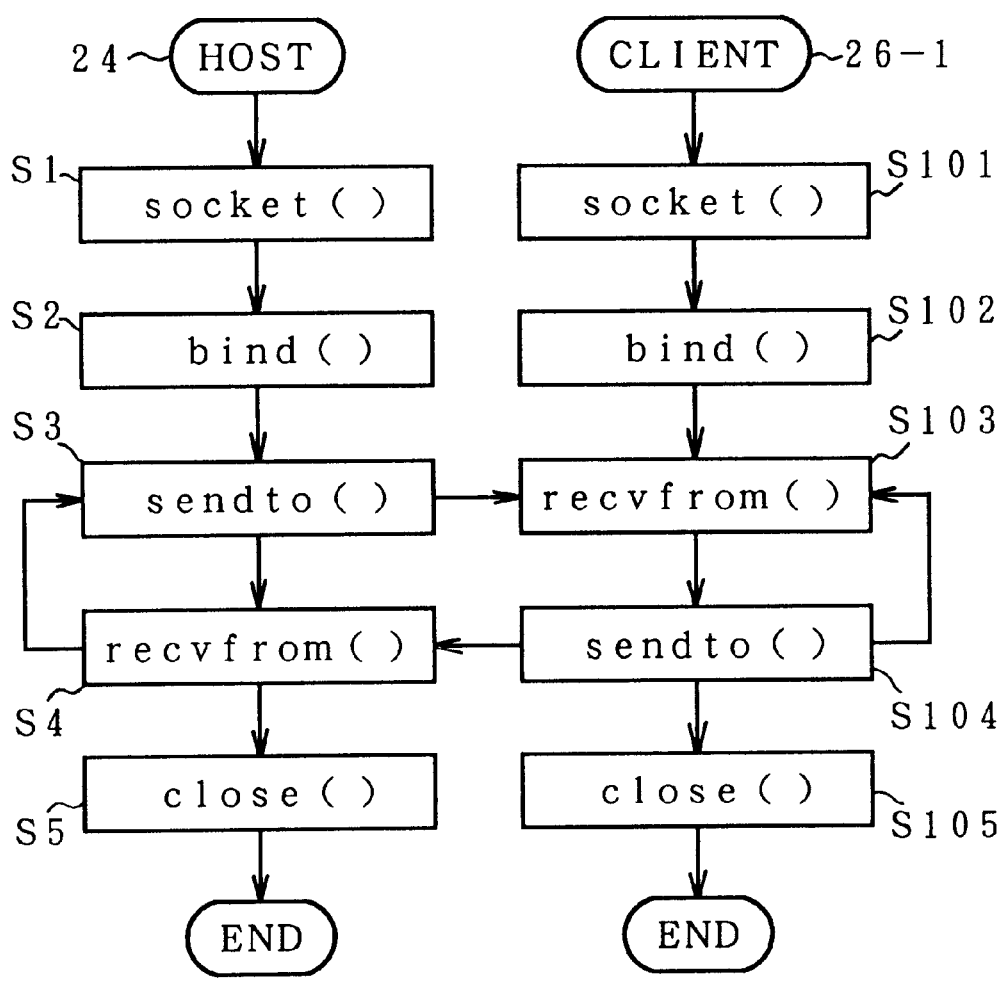
FIG. 16 is a flowchart for a network transferring process by a socket interface which is used as a TCP/IP layer protocol interface in FIG. 7.

For example, a socket interface can be used as a TCP/IP layer protocol interface 32 for the network 10 provided for the host 24 and clients 26-1 and 26-2 in FIG. 7. FIG. 16 shows a processing procedure for the socket interface in case of transmitting a message of a compressing process of the data file to, for example, the compression reconstructing process 38-1 of the client 26-1 of the archiver managing process 30 of the host 24. First on the host 24 side, an IP address, for instance, "122. 122. 32. 17" of the client 26-1 and a port number, for example, "TCP-51" owned by the compression reconstructing process 38-1 of the client 26-1 are designated. In step S1, a socket is formed by calling "socket( )". In step S2, the address of the host 24 is connected to the socket by "bind( )". This address becomes an IP address of the self host. Subsequently, in steps S3 and S4, messages are transmitted between the host and the client 26-1 by using "sendto( )" and "recvfrom( )". With respect to the client 26-1 side as well, the formation of the socket in step S1 and the connection of the address of the client itself to the socket in step S2 are performed. In step S103, a message from the host 24 is received. In step S104, a message is returned to the host 24. When the transmission and reception of the messages are normally finished in the host 24 and client 26-1, the socket is released in "close( )" in step S5. A proper TCP/IP layer protocol interface other than the socket interface can be also used.

Figure 17:
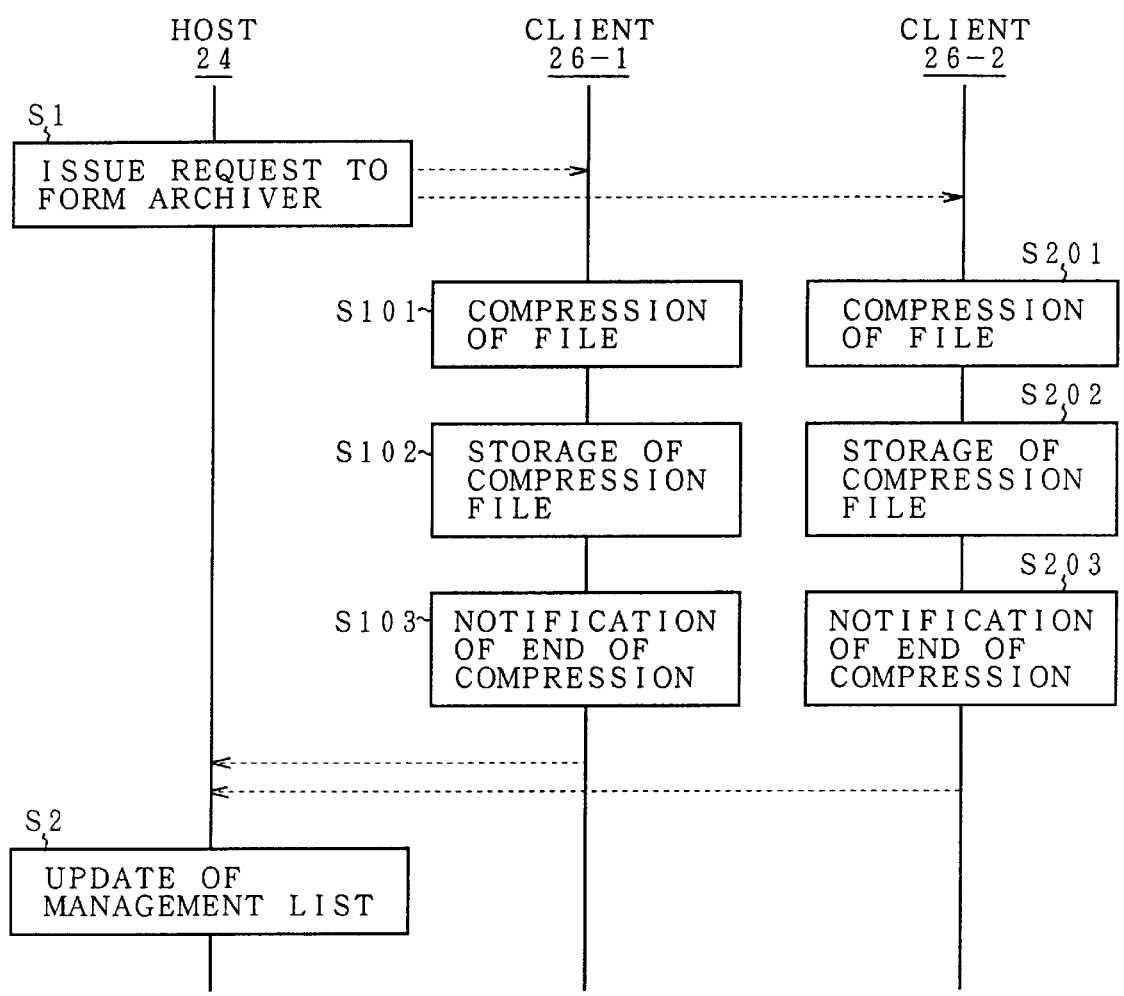
FIG. 17 is a time chart for an archiver forming process in the system form I of FIG. 7.

FIG. 17 is a time chart for the archiver forming process in the system form I and relates to the processes in the case where in each of the clients 26-1 and 26-2 constructing the sharing group, for example, the person in charge respectively forms a data file such as a monthly report or the like and stores the formed data file into the archiver. In response to the file storing operation of the data file on each side of the clients 26-1 and 26-2, in the archiver managing process 30 of the host 24, in step S1, a compressing command is generated as an archiver forming request to each of the clients 26-1 and 26-2. The clients 26-1 and 26-2 receive the compressing command from the host 24 and execute the compression of the data files in steps S101 and S201 and store the compressed data files into the archiver files 34-1 and 34-2 which are provided for the own file unit and are distributed and arranged in steps S102 and S202, respectively. After completion of the storage of the compressed data files to the archiver files 34-1 and 34-2, the end of compression is notified to the host 24 in step S103. In response to the compression end notification from the clients 26-1 and 26-2 side, the host 24 updates the archiver management list 28 into a compressing state in step S2. FIG. 18 shows a catalog list 58 in which the updating of the management list was finished in association with the end of compression on the client side by the archiver forming request in step S2 in FIG. 17. The diagram shows a state in which the data files having the file names "a" and "b" have been stored as compression data by the clients 26-1 and 26-2 into the archiver files 34-1 and 34-2 which were distributed and arranged while setting compression ratios to 46% and 41%, respectively.

Figure 19:
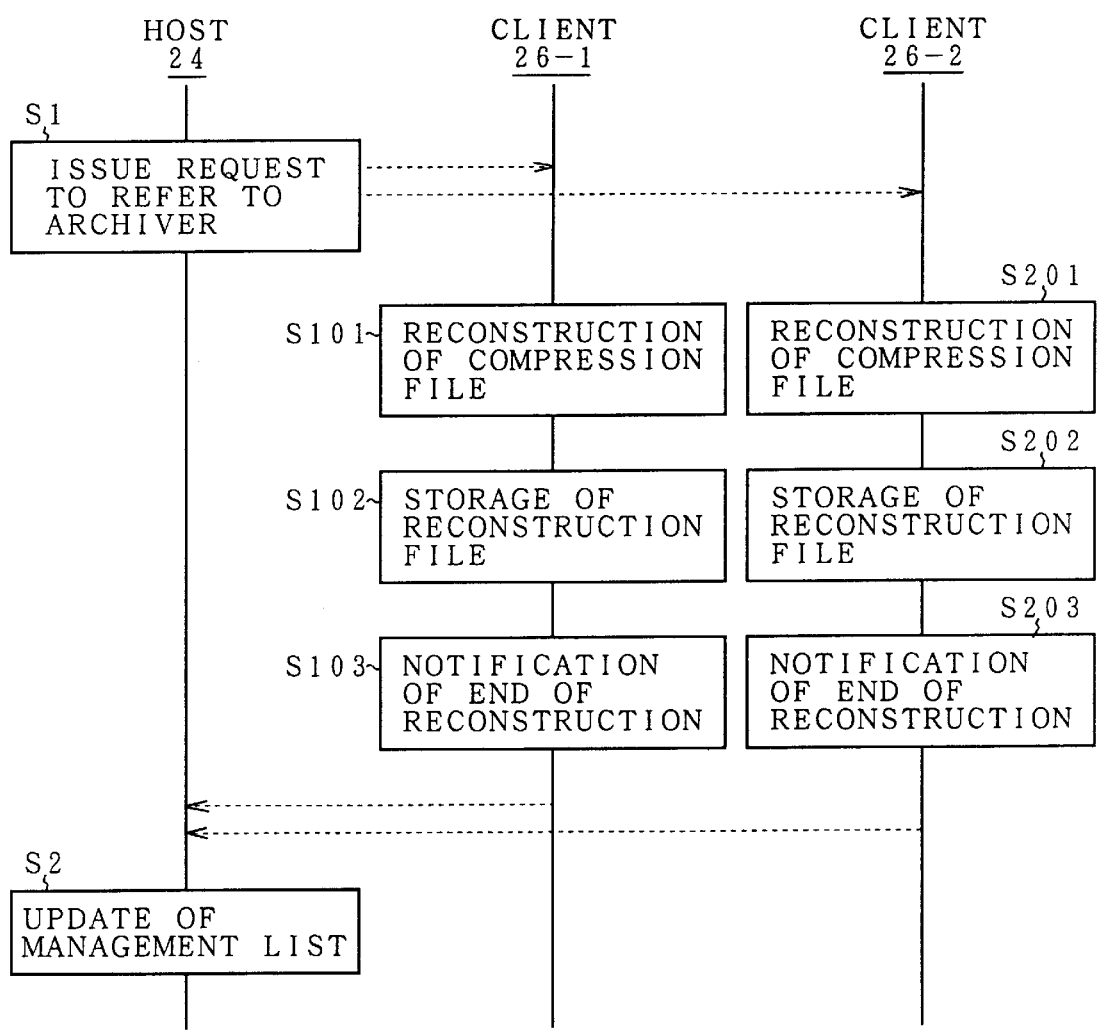
FIG. 19 is a time chart for an archiver referring process in the system form I of FIG. 7.
Figure 20:
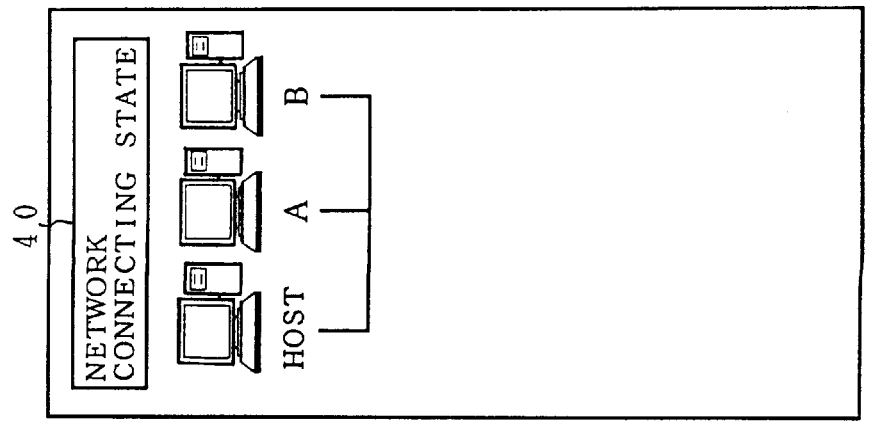
FIG. 20 is an explanatory diagram of the updated catalog list after completion of the archiver referring process in FIG. 19.

FIG. 19 is a time chart when referring to the data files of the distributed and arranged archiver files 34-1 and 34-2 of the clients 26-1 and 26-2 in the system form I in FIG. 7. First, the referring operation of the archiver file in each of the clients 26-1 and 26-2 is recognized on the host 24 side, a reconstructing command is generated as an archiver referring request to the clients 26-1 and 26-2 in step S1. In response to the reconstructing command, in steps S101 and S201, the relevant compressed data files are read out by retrieving the archiver files 34-1 and 34-2 and the compression data is reconstructed. After completion of the reconstruction, the reconstructed data file is stored into each of the archiver files 34-1 and 34-2 in step S102. In steps S103 and S203, the end of reconstruction is notified to the host 24. In response to the reconstruction end notification, the host 24 updates the archiver management list 28 in step S2. As for the catalog list after the updating, as shown in the catalog list 58 in FIG. 20, the updated information as a reconstruction result serving as "Reconstructed" is recorded in the portion of the compression ratio.

Figure 21:
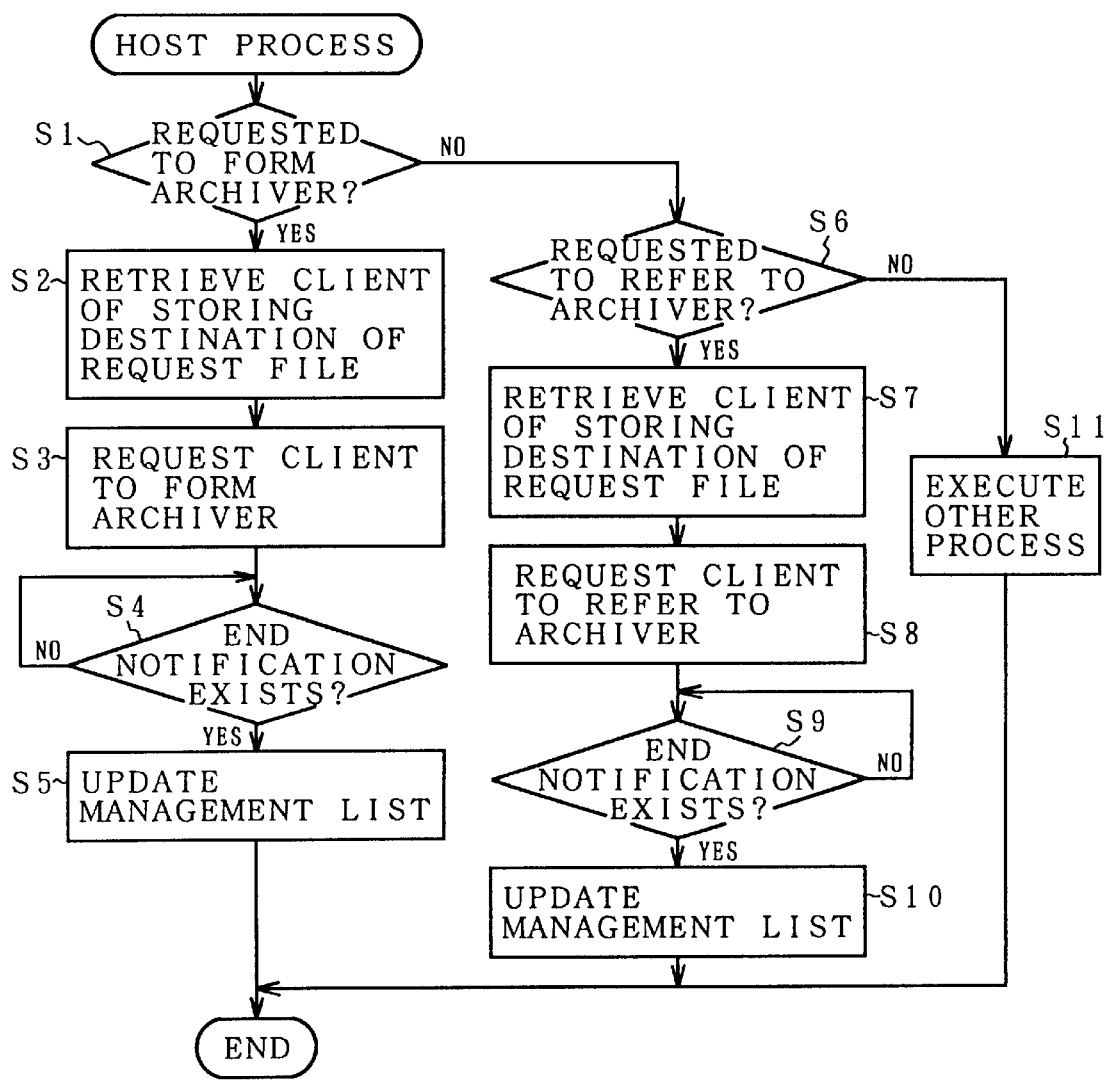
FIG. 21 is a flowchart for a host process in the system form I.

FIG. 21 is a flowchart for host processes in the processes of the archiver forming request and archiver referring request in FIGS. 17 and 19. First in step S1, the archiver forming request is checked. When there is the forming request, step S2 follows and the client on the storage destination side of the request file is retrieved from the archiver management list 28. In step S3, the formation of the archiver is requested to the client on the retrieved request file storage destination side. Specifically speaking, a compressing command of the data files is generated. In response to the compressing command, on the client side, the compression of the data files and the storage of the archiver file are executed. After completion of the compression, a check is made to see if the end has been notified in step S4. In step S5, the archiver management list 28 is updated. When the archiver referring request is discriminated in step S6, in step S7, the client on the storage destination side of the request file is retrieved with reference to the archiver management list 28. In step S8, the reference to the archiver is requested to the retrieved client. Specifically speaking, the reconstructing command is generated to the client. On the client side which received the reconstructing command, the relevant compressed data file is read out from the archiver file and reconstructed and an end notification is generated. When the reconstruction end notification is discriminated in step S9, step S10 follows. With respect to the relevant data file of the archiver management list 28, the compressing state is updated into the reconstructing state. As for processing requests other than the archiver forming request and the archiver referring request, another process in association with the request is executed in step S11.

Figure 22:
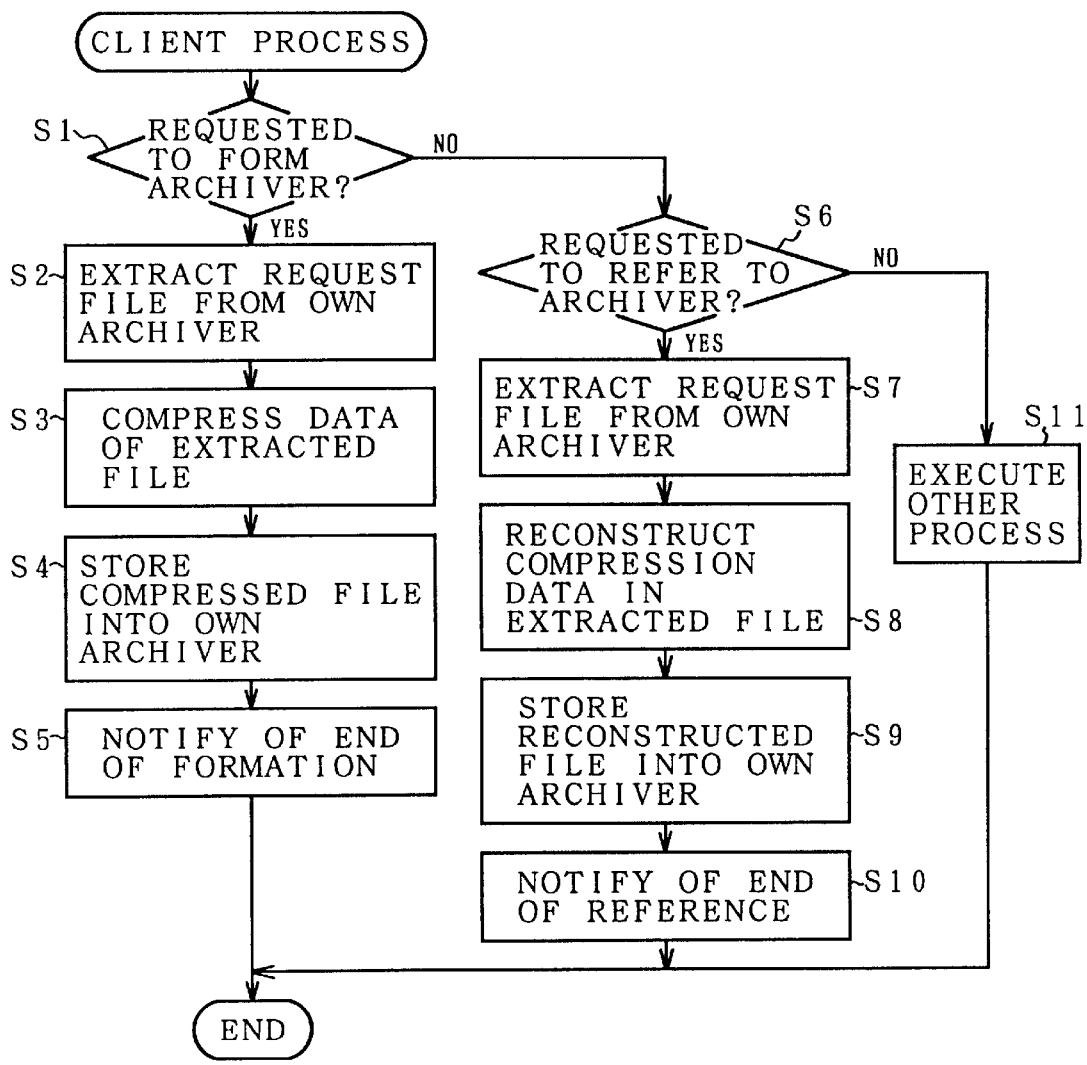
FIG. 22 is a flowchart for a client process in the system form I.

FIG. 22 is a flowchart for client processes in the archiver forming request and the archiver referring request in FIGS. 17 and 19. In the client processes, when the archiver forming request from the host, specifically, the file compressing command is discriminated in step S1, the request file is extracted from the own archiver file in step S2. The extracted data file is compressed in step S3. After the compression was finished, the compressed data file is stored into the own archiver in step S4. The end of formation is notified in step S5. In step S6, when the archiver referring request from the host, specifically, the data file reconstructing command is discriminated, step S7 follows and the request file is extracted from the own archiver. In step S8, the compressed data of the extracted file is reconstructed. In step S9, the reconstructed data file is again stored into the own archiver. In step S10, the end of reference is notified to the host. With respect to processing requests other than the archiver forming request and the archiver referring request, another process in association with the request is executed in step S11. The load on the host can be reduced by the distribution arrangement of the archivers onto the client side and the distribution arrangement of the compression reconstructing process onto the client side in such a system form I. Since the archiver is not provided on the host side but the archivers are distributed and arranged on only the client side, the duplex of the data file can be certainly avoided.

(Distribution, compression, and reconstruction and the system form of concentrated archiver)

Figure 23:
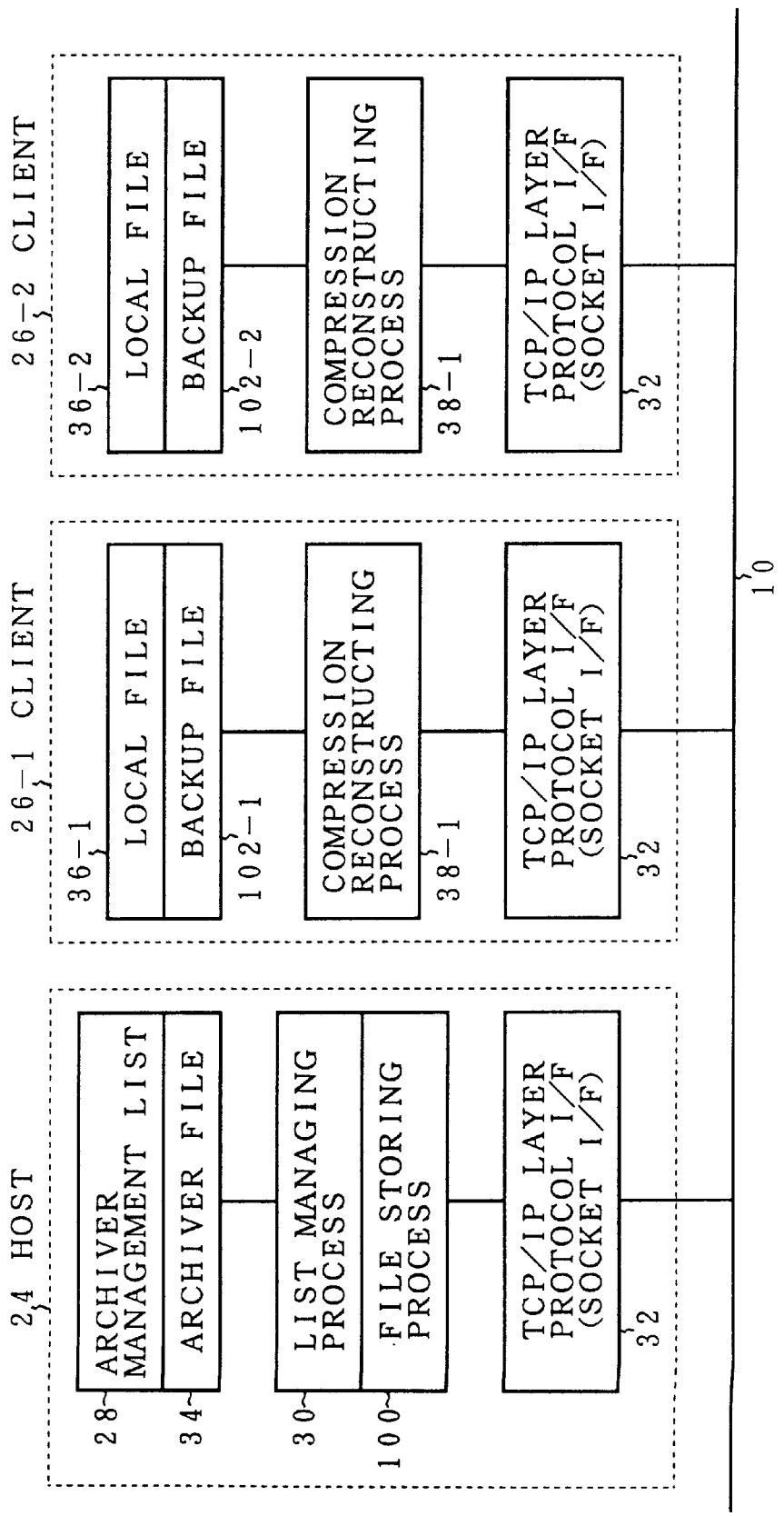
FIG. 23 is a block diagram of system functions to realize a system form II.

FIG. 23 is a functional block diagram of a network archiver system of the invention according to the system form II in FIGS. 5 and 6. In the system form II, in the host 24, the database bookmark constructed by a set of catalogs as archiver management information is concentratedly managed. Further, with respect to the archivers, they are concentratedly arranged as an archiver file 34 into the host 24. As for the compression and reconstruction, in a manner similar to the system form II, they are distributed and arranged onto the clients 26-1 and 26-2 side. Specifically speaking, in addition to the archiver management list 28, the archiver file 34 is concentratedly arranged to the host 24. In addition to the archiver managing process 30, a file storing process 100 is provided. With respect to the clients 26-1 and 26-2 side, in a manner similar to the case of the system form I, the compression reconstructing processes 38-1 and 38-2 are distributed and arranged. With respect to the file unit side, in addition to the local files 36-1 and 362, in the embodiment, backup files 102-1 and 102-2 for storing, as backup data, the data which was compressed or reconstructed by the compression reconstructing processes 38-1 and 38-2 and transferred and stored into the archiver file 34 of the host 24 are provided. The arrangement of the backup files 102-1 and 102-2 is executed as necessary.

Figure 24:
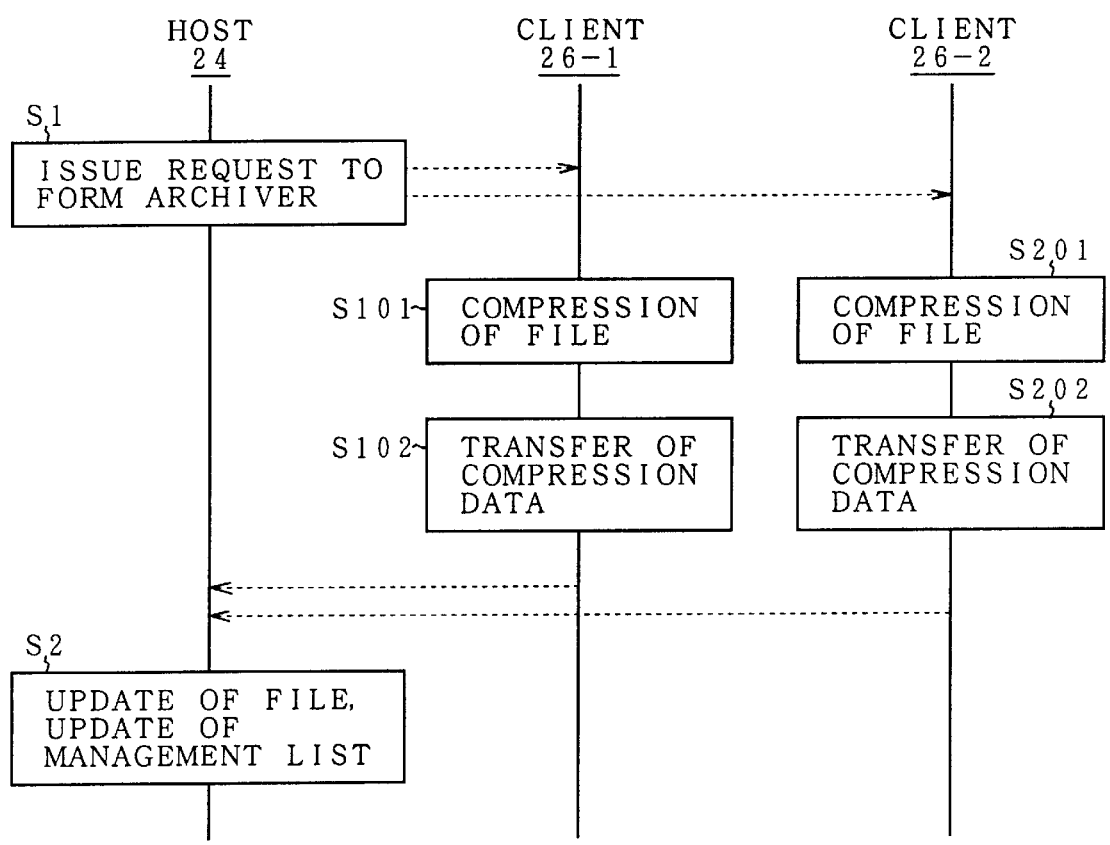
FIG. 24 is a time chart for an archiver forming process in the system form II of FIG. 23.
Figure 25:
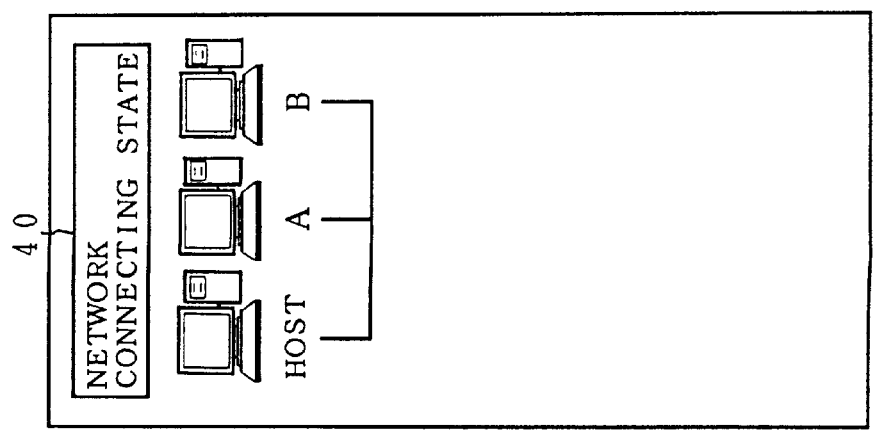
FIG. 25 is an explanatory diagram of the updated catalog list after completion of the archiver forming process in FIG. 24.

FIG. 24 is a time chart for the archiver forming process in the system form II in FIG. 23. In step S1 of the host 24, when the storing operation for the archiver based on the formation result of the data file such as a monthly report or the like on the clients 26-1 and 26-2 side is recognized, the compressing command is generated as an archiver forming request to the clients 26-1 and 26-2. In response to the compressing command from the host 24, the clients 26-1 and 26-2 compress the data files in steps S101 and S201 and transfer the compressed data files to the host 24 in steps S102 and S202, respectively. By receiving the transfer of the compressed data files from the clients 26-1 and 26-2 side, the host 24 executes the storage of the compressed file data into the own archiver file 34 by the execution of the file storing process 100 and the updating of the archiver management list 28 by the archiver managing process 30 in step S2. For example, as shown in FIG. 25, the catalog list 58 as an archiver management list which was updated by the process in FIG. 24 is set into an updating state in which the value of the actual compression ratio has been stored in the portion of the compression ratio of the last item of each file name.

Figure 26:
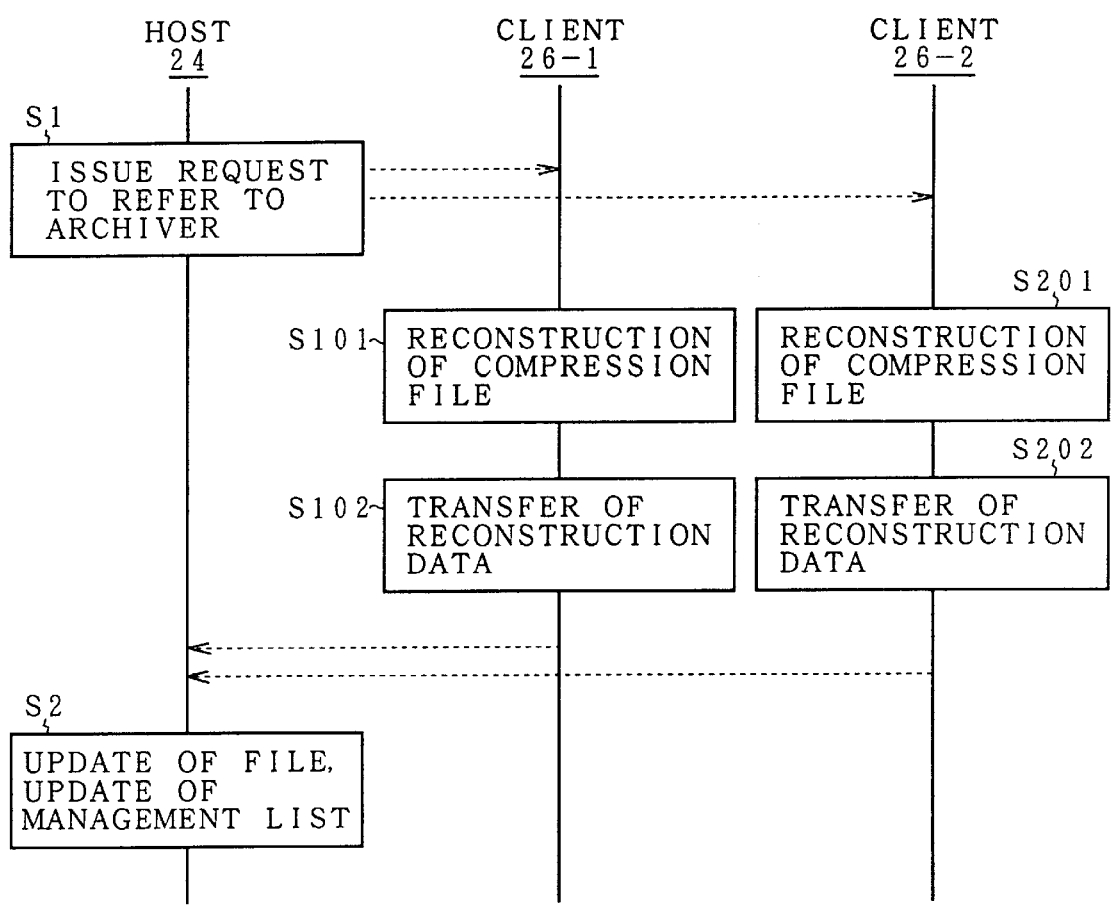
FIG. 26 is a time chart for an archiver referring process in the system form II of FIG. 23.

FIG. 26 is a time chart for the archiver referring process in the system form II in FIG. 23. When the referring operations of the data files of the file names a and b or the like formed by the clients themselves are executed on the clients 26-1 and 26-2 side with reference to, for example, the catalog list 58 as shown in FIG. 25, the host 24 recognizes the referring operation on the clients 26-1 and 26-2 side. In step S1, the host 24 generates the reconstructing command of the data files to the clients 26-1 and 26-2 as an archiver referring request. Further, the host 24 reads out the relevant compressed data file from the archiver file 34 by the file storing process 100 and transfers to the clients 26-1 and 26-2. By receiving the reconstructing command from the host 24 and the transfer of the compressed data file as a reconstruction target, the clients 26-1 and 26-2 execute the reconstruction of the compressed data file in steps S101 and S201 and transfer the reconstructed raw data to the host 24 in steps S102 and S202, respectively. The host 24 which received the transfer of the reconstructed data files stores the reconstructed data files into the archiver file 34 by the file storing process 100 in step S2 and, further, updates the state of the data file in the relevant catalog list in the archiver file 34 into the reconstructing state by the archiver managing process 30.

Figure 27:
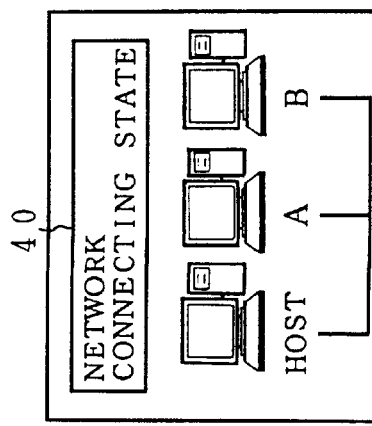
FIG. 27 is an explanatory diagram of the updated catalog list after completion of the archiver referring process in FIG. 26.

FIG. 27 shows the catalog list 58 updated by the end of the archiver referring process in FIG. 26 and "Compressed" indicative of the end of updating is displayed in the columns of the compression ratio of the file names a and b as reference targets. In FIGS. 24 and 26, when the compression of the data files or the reconstruction of the compressed data files are executed on the clients 26-1 and 26-2 side, the compressed or reconstructed data files are transferred to the host 24 side and, at the same time, they are preserved as backup data into the backup files 102-1 and 102-2 and can be also used as a backup for the archiver file 34 on the host 24 side.

Figure 28:
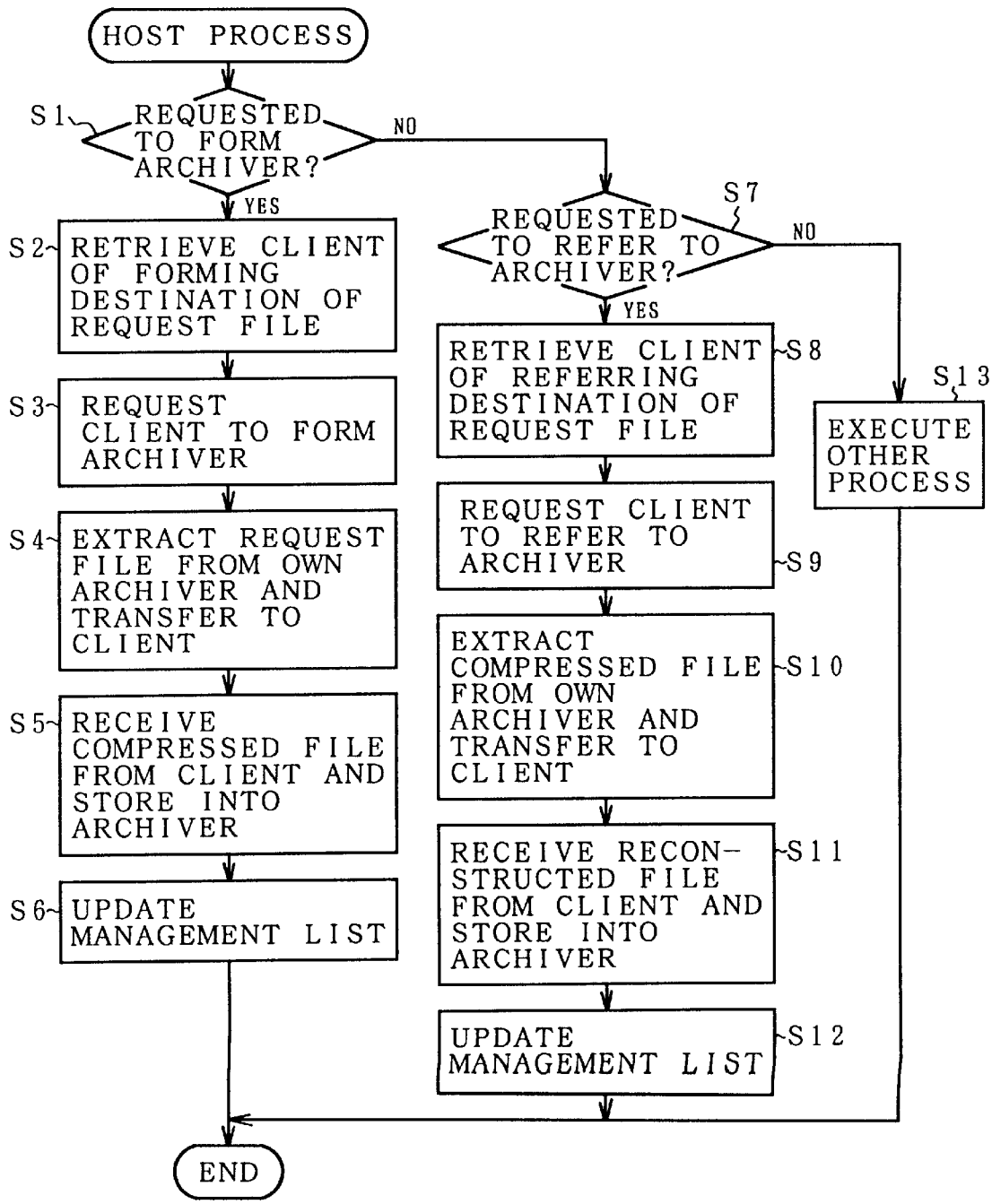
FIG. 28 is a flowchart for a host process in the system form II.

FIG. 28 is a flowchart for the host processes in the archiver forming process and the archiver referring process in the system form II in FIG. 23. In the host 24, when the archiver forming request is discriminated in step S1, step S2 follows and the client serving as a forming destination side of the request file is obtained by retrieving the archiver management list 28 by the archiver managing process 30. In step S3, the formation of the archiver is requested to the client. Specifically speaking, the compressing command is generated to the retrieved client. In step S4, the request data file is read out from the own archiver file 34 and transferred to the client serving as a compression destination side. In step S5, when the compressed data file is received from the client side, it is stored into the archiver file 34. Further, in step S6, the archiver management list is updated into the compressing state. When the archiver referring request is discriminated in step S7, the archiver managing process 30 refers to the archiver management list 28 and retrieves the client serving as a reference destination side, namely, the client to reconstruct the compressed file data in step S8. In step S9, the archiver reference is requested to the client. That is, the reconstructing command is generated to the client. In step S10, the relevant compressed data file is extracted from the archiver file 34 of the host 24 itself and is transferred to the client. When the reconstruction of the compressed data file is finished on the client side and the raw data file is transferred, it is received in step S11 and stored into the archiver file 34. Further, in step S12, the archiver management list 28 is updated into the reconstructing state. When there is processing requests other than the archiver forming request or archiver referring request, step S13 follows and another process is executed.

Figure 29:
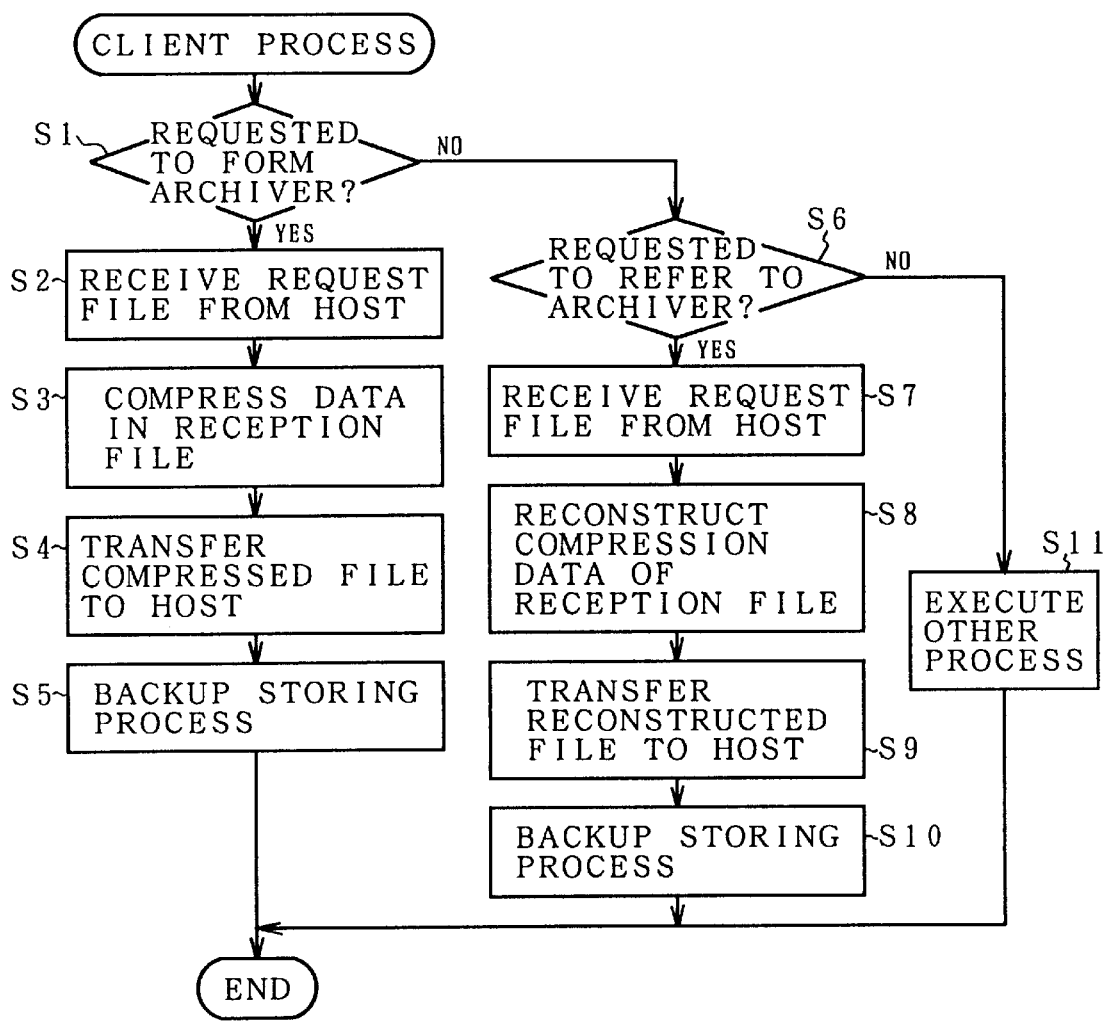
FIG. 29 is a flowchart for a client process in the system form II.

FIG. 29 is a flowchart for the client processes in the system form II in FIG. 23. First in step S1, when the compressing command from the host 24 is discriminated as an archiver forming request, step S2 follows and the request data file as a formation target is received from the host 24. In step S3, the data of the received data file is compressed. In step S4, the compressed data file is transferred to the host 24. Further, if necessary, the compressed data file is stored as backup data into the backup file in step S5. When the reconstructing command as an archiver referring request from the host is discriminated in step S6, step S7 follows and the compressed data file as a request file is received from the host 24. In step S8, the compression data of the received data file is reconstructed. In step S9, the reconstructed data file is transferred to the host 24. Further, if necessary, the backup process to store into the backup files 102-1 and 102-2 is executed in step S10. If there are processing requests other than the archiver forming request or the referring request, another process is executed in step S11.

(Concentration, compression, and reconstruction and the system form of distribution archiver)

Figure 30:
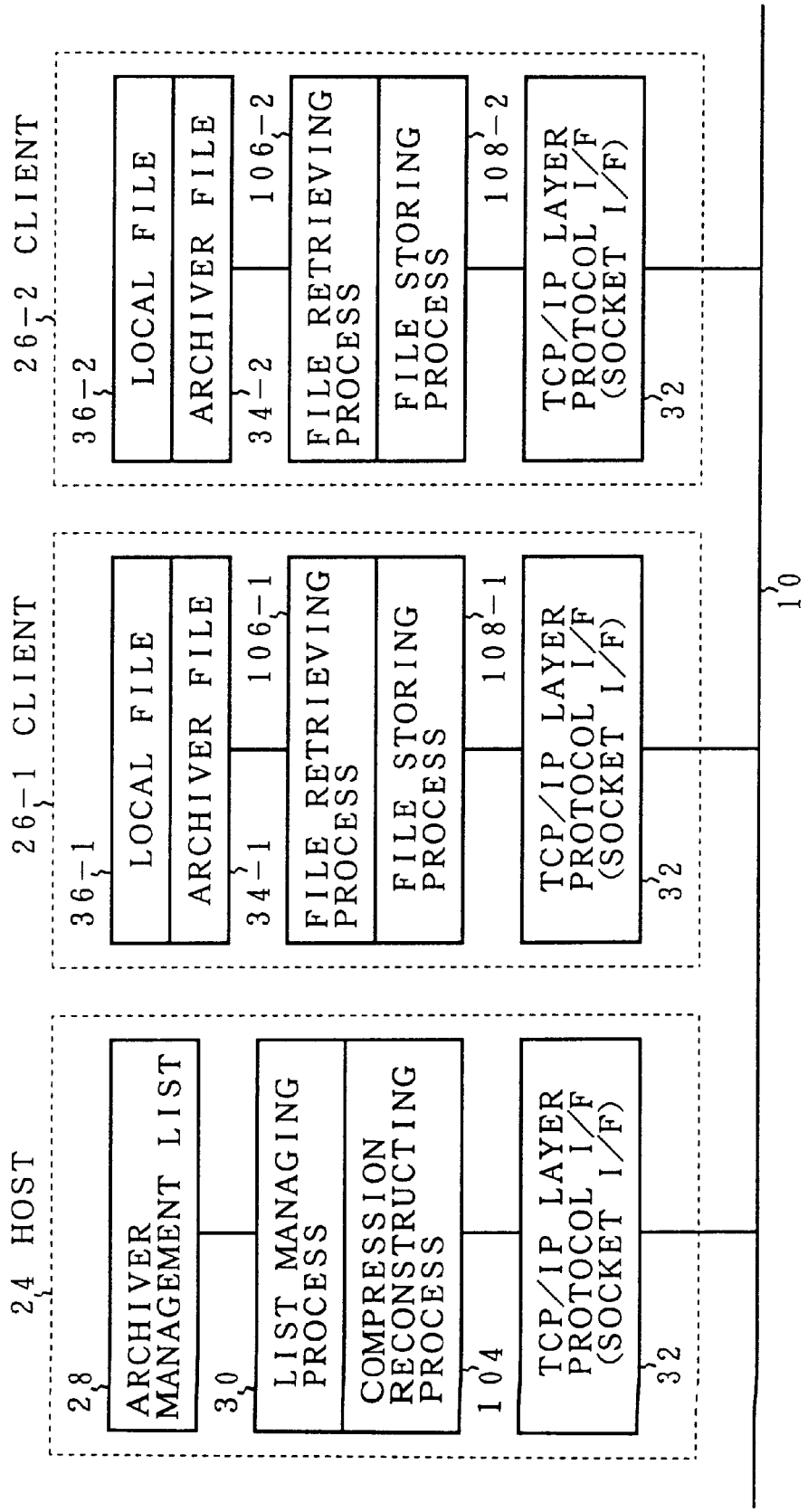
FIG. 30 is a block diagram of system functions to realize a system form III.

FIG. 30 is a functional block diagram of the system form III in FIGS. 5 and 6. In the system form III, it is characterized by the concentration, compression, and reconstruction type in which a compression reconstructing process 104 is concentrated to the host 24 and the archiver files 34-1 and 34-2 in which the archivers are distributed to the clients 26-1 and 26-2. By concentrating the compression reconstructing process 104 to the host 24 as mentioned above, the system management regarding the compression and reconstruction of the file data can be easily performed. Since the compression reconstructing process 104 is not provided on the clients 26-1 and 26-2 side, the load on the client side can be reduced by only an amount corresponding to it.

Figure 31:
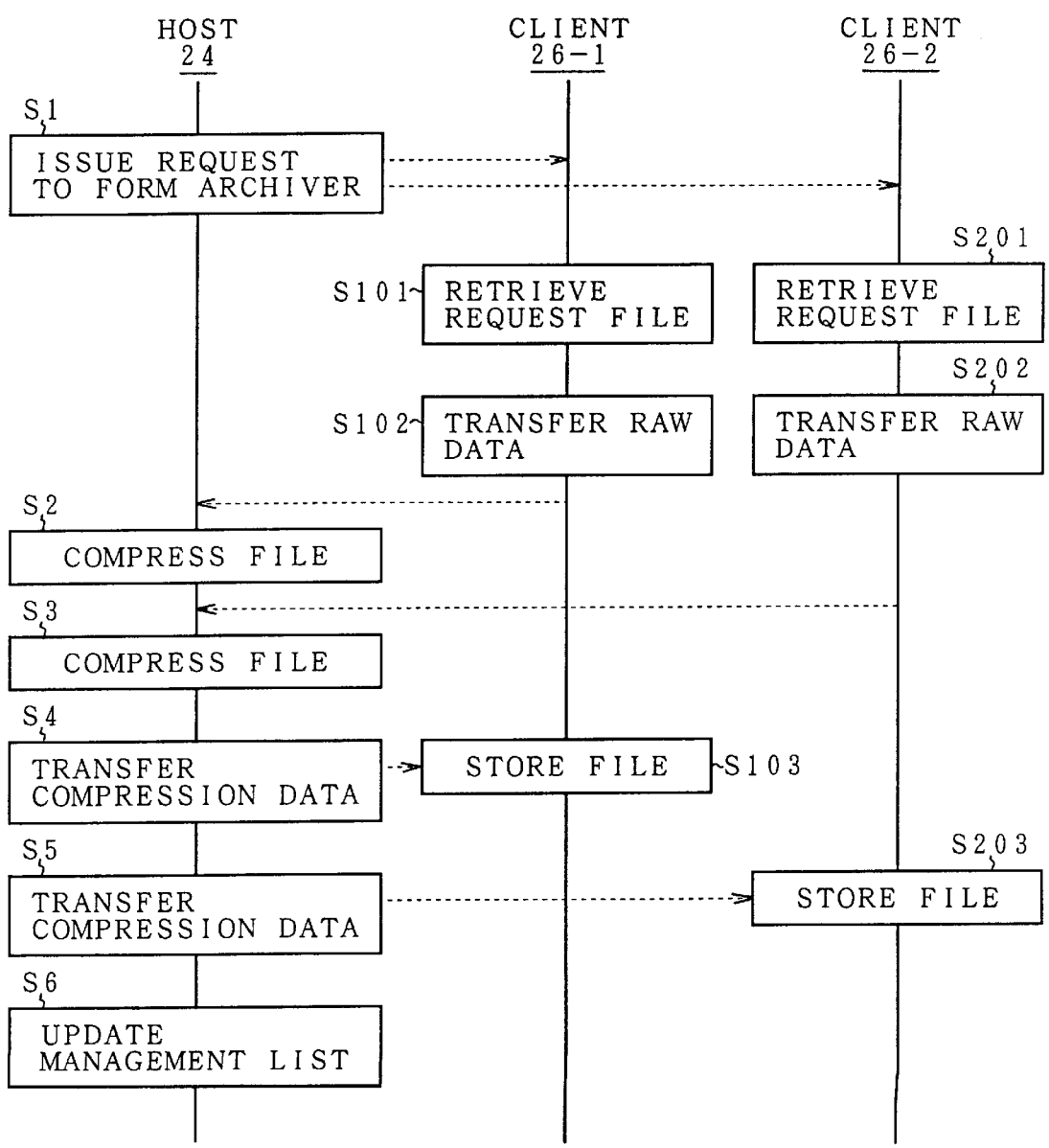
FIG. 31 is a time chart for an archiver forming process in the system form III of FIG. 30.
Figure 32:
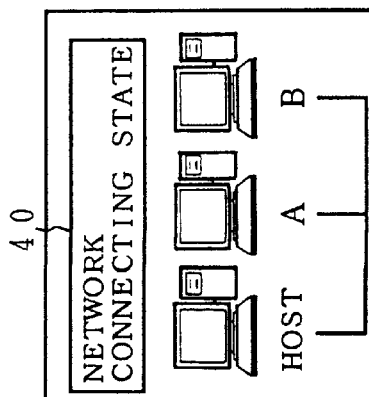
FIG. 32 is an explanatory diagram of the updated catalog list after completion of the archiver forming process in FIG. 30.

FIG. 31 is a time chart for the archiver forming process in the system form III in FIG. 30. In the host 24, when the archiver forming operation for archiver storage in association with the end of formation of the data files in the clients 26-1 and 26-2 is recognized in step S1, the retrieving command of the data files is generated as an archiver forming request to the clients 26-1 and 26-2. When the clients 26-1 and 26-2 receive the retrieving command from the host 24, in steps S101 and S201, file retrieving processes 106-1 and 106-2 retrieve the requested data files with reference to the own archiver files 34-1 and 34-2 and transfer the file data as raw data to the host 24 in steps S102 and S202. By receiving the transfer of the request data files from the clients 26-1 and 26-2, the host 24 compresses the data file transferred from the client 26-1 in step S102 by the compression reconstructing process 104 in step S2. The data file transferred from the client 26-2 is also compressed in step S3. After the compression was finished, the compressed data file is sent to the client 26-1 in step S4. In step S103, the client 26-1 stores the compressed data file into the own archiver file 34-1. In sep S5, the compressed data file is transferred to the client 26-2. In step S203, a file storing process 108-2 of the client 26-2 stores the compressed data file into the own archiver file 34-2. After completion of the compressing process in association with the series of archiver forming requests, the host 24 updates the archiver management list in step S6. The catalog list 58 of the updated management list in this case is as shown in, for example, FIG. 32.

Figure 33:
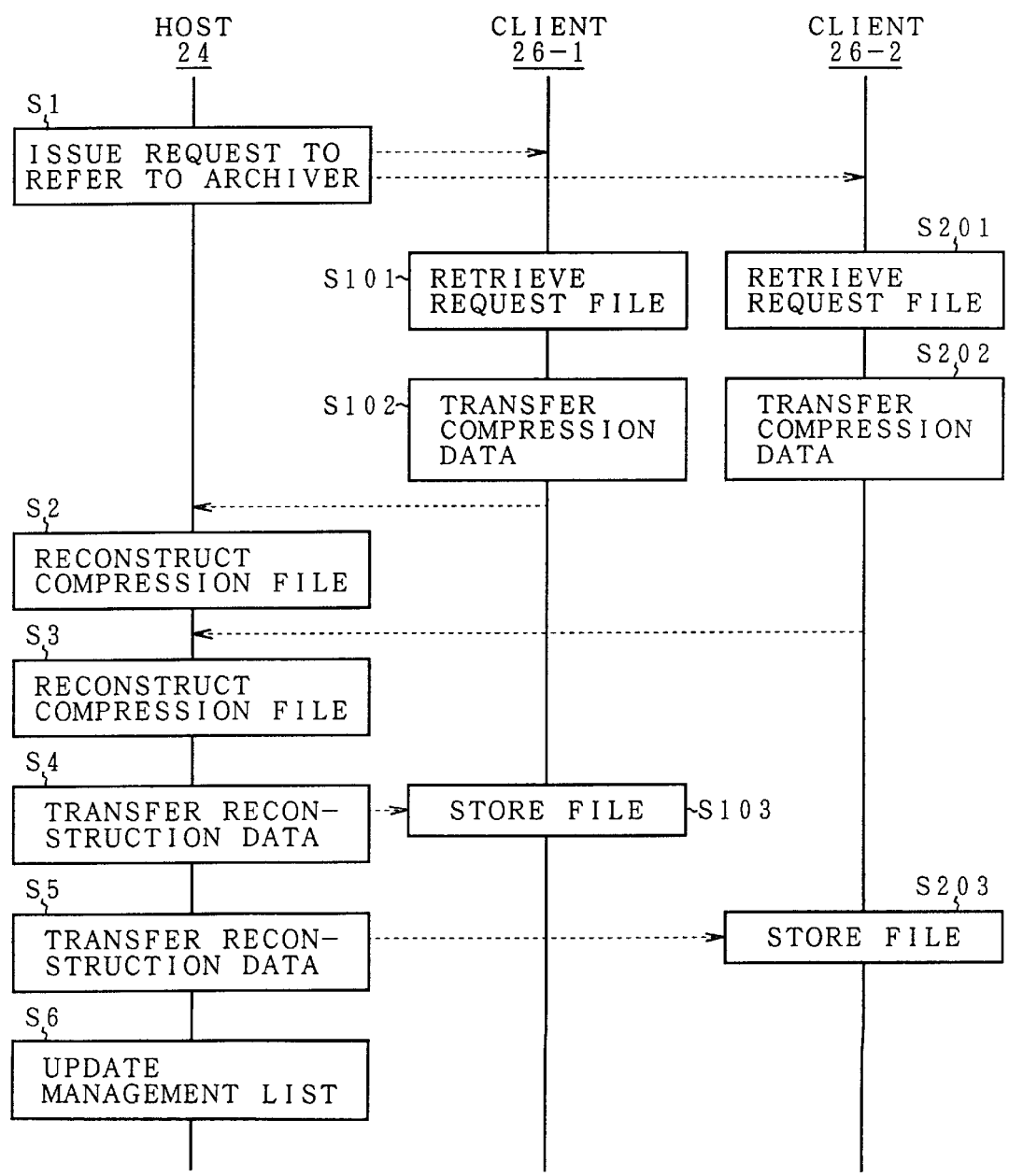
FIG. 33 is a time chart for an archiver referring process in the system form III of FIG. 30.
Figure 34:
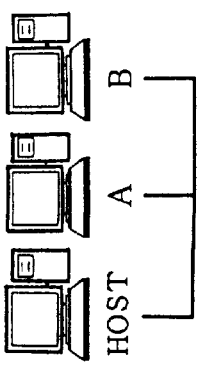
FIG. 34 is an explanatory diagram of the updated catalog list after completion of the archiver referring process in FIG. 33.

FIG. 33 is a time chart for the archiver referring process in the system form III in FIG. 31. Now, when operations to refer to proper file data are executed on the clients 26-1 and 26-2 side while seeing the catalog data as an archiver reference list, they are recognized by the host 24. The retrieving command is generated as an archiver referring request to the clients 26-1 and 26-2 in step S1. When receiving the retrieving command from the host 24, the clients 26-1 and 26-2 retrieve the requested data files in which the file retrieving processes 106-1 and 106-2 were requested with reference to the own archiver files 34-1 and 34-2 in steps S101 and S201. The client 26-1 transfers the retrieved data file to the host 24 in step S102. The host 24 reconstructs the compressed data file in step S2. The client 26-2 transfers the compressed data file retrieved in step S202 to the host 24. The data file is reconstructed in step S3. The data file reconstructed in step S2 is transferred to the client 26-1 in step S4 and is stored into the own archiver file 34-1 of the client 26-1 by a file storing process 108-1 in step S103. Similarly, the data file reconstructed in step S3 is transferred to the client 26-2 in step S5. In step S203, the reconstructed data file is stored into the own archiver file 34-2 of the client 26-2. When the series of requesting processes are finished, the host 24 updates the archiver management list 28 into the reconstructing state of "Reconstructed" as shown in, for example, the column of the compression ratio of the catalog list 58 in FIG. 5 in step S6.

Figure 35:
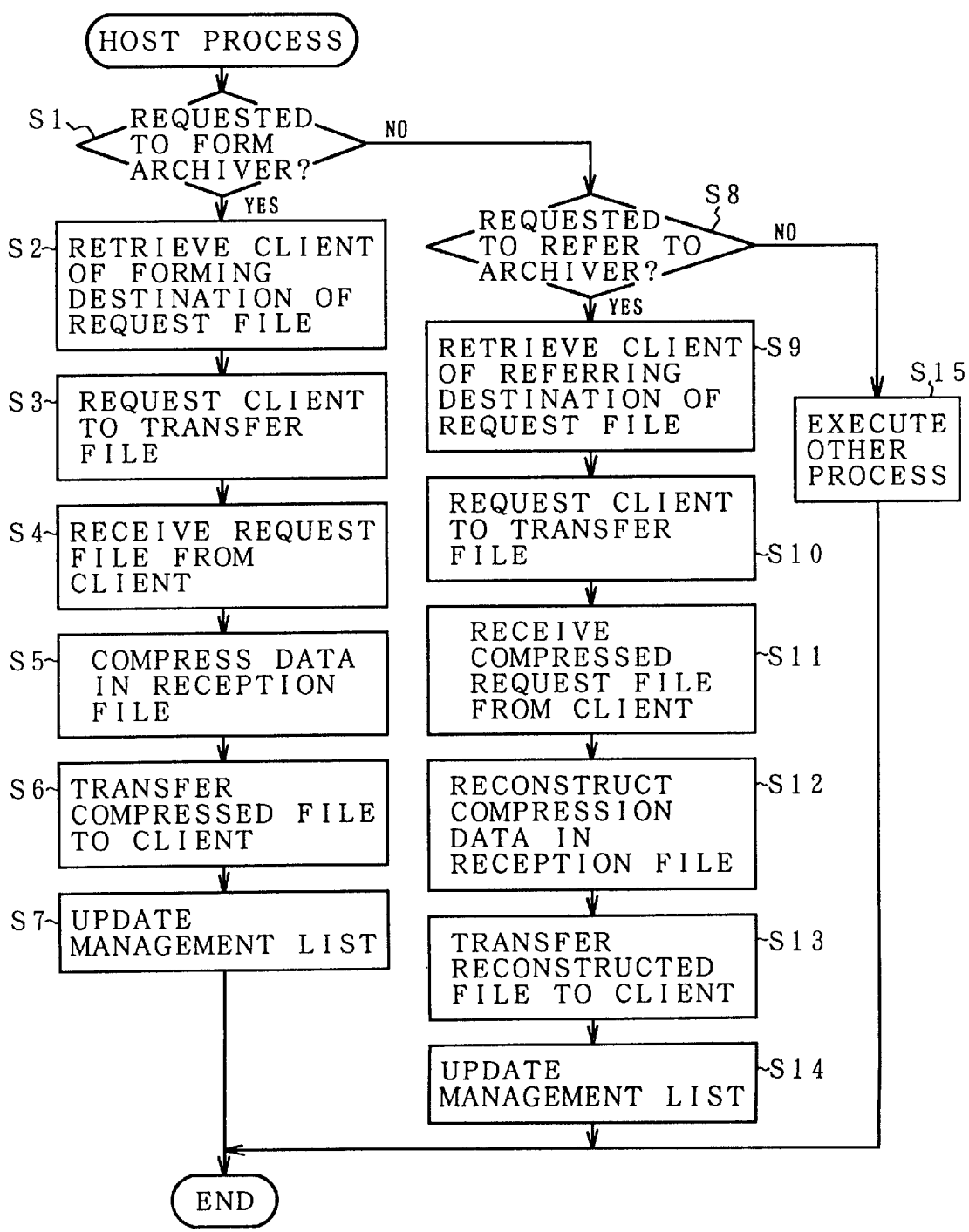
FIG. 35 is a flowchart for a host process in the system form III.

FIG. 35 is a flowchart for the host processes in the system form III in FIG. 30. When data files such as daily reports or the like are formed on the clients 26-1 and 26-2 side in FIG. 30, the host 24 discriminates the archiver forming request in step S1 by the finishing operation. The processing routine advances to step S2. The client on the data file formation destination side which generated the request is retrieved from the archiver management list 28 by the archiver managing process 30. A file transfer is requested to the retrieved client in step S3. Namely, a file transfer command is generated. In response to the file transfer request, when the request data file from the client is received in step S4, the data of the received data file is compressed by the compression reconstructing process 104 in step S5. In step S6, the compressed data file is transferred to the client. Further, the archiver management list is updated into the compressing state in step S7. In step S8, when the archiver referring request from the clients 26-1 and 26-2 side is discriminated, step S9 follows. The client on the reference destination side is retrieved with reference to the archiver management list 28 by the archiver managing process 30. The file transfer is requested to the retrieved client in step S10.

In response to the file transfer, when the compressed request data file from the client is received in step S11, the compression reconstructing process 104 is activated and the compression data of the received data file is reconstructed in step S12. In step S13, the reconstructed data file is transferred to the client. Finally, in step S14, the archiver management list is updated into the reconstructing state. As for a request other than the archiver forming request or the referring request, another process is executed in step S15.

Figure 36:
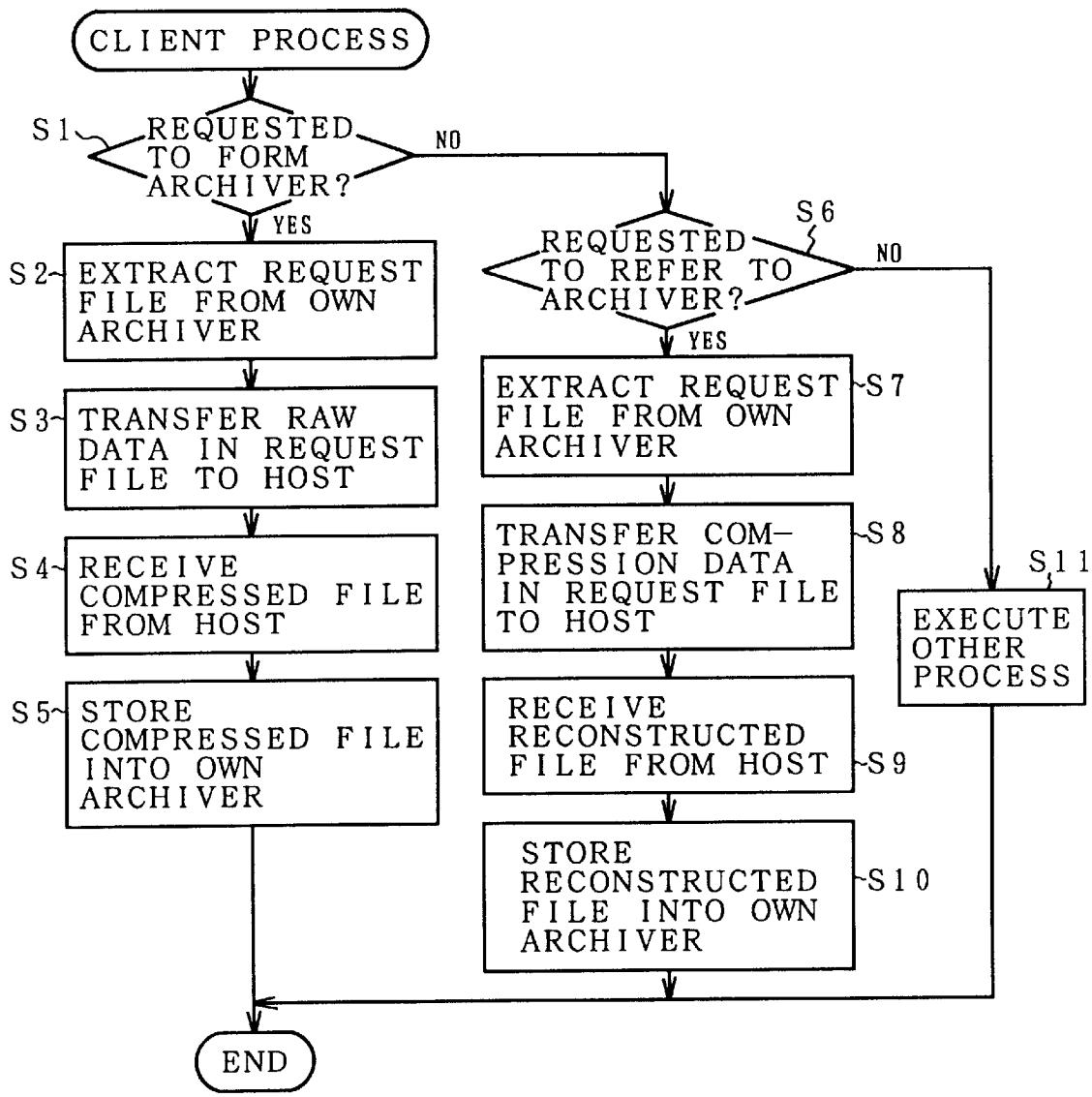
FIG. 36 is a flowchart for a client process in the system form III.

FIG. 36 is a flowchart for the client processes in the system form III in FIG. 30. In step S1, when the file transfer command as an archiver forming request from the host 24 is discriminated, step S2 follows. The file retrieving processes 106-1 and 106-2 extract the requested data files from the own archiver files 34-1 and 34-2 and transfer to the host 24 in step S3. The transferred data files are compressed on the host 24 side and, thereafter, they are returned. Therefore, in step S4, the compressed data files from the host 24 are received. In step S5, the compressed data files transferred from the host are stored into the own archiver files 34-1 and 34-2. In step S6, when the data transfer command from the host 24 as an archiver referring request is likewise discriminated, step S7 follows and the request file data is extracted from the archiver files 34-1 and 34-2 by the file retrieving processes 106-1 and 106-2. In step S8, they are transferred to the host 24. The compressed data files transferred to the host are reconstructed and, thereafter, they are again sent. Therefore, the reconstructed data files from the host are received in step S9. In step S10, the received data files are stored into the own archiver files 34-1 and 34-2 side by the file storing processes 108-1 and 108-2. As for a request other than the archiver forming request or the referring request, another process is executed in step S11.

(Other system forms)

Figure 37:
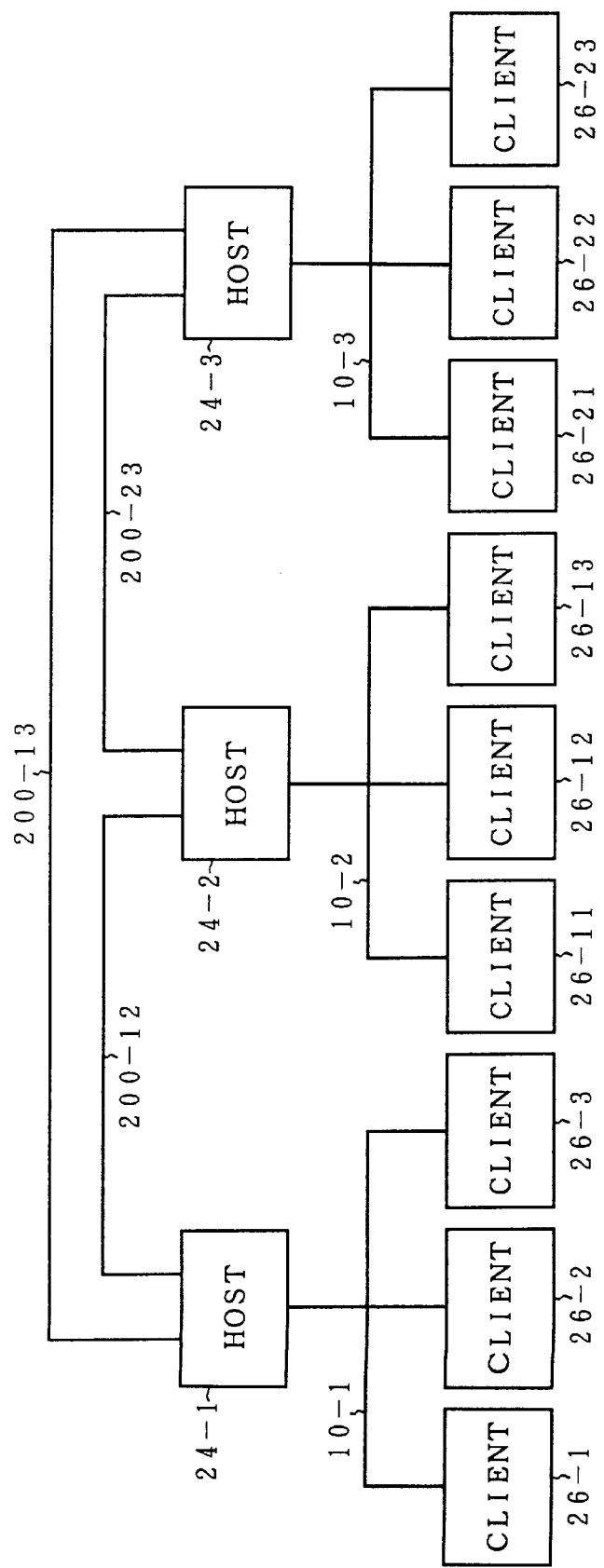
FIG. 37 is a block diagram of an expansion system in which a plurality of groups of hosts are mutually connected, thereby enabling an access exceeding the groups to be performed.

FIG. 37 shows a system form in which the network archiver system in FIG. 4 is further expanded. That is, a plurality of sharing groups are formed, thereby making it possible to mutually form and refer to archivers among the groups. A sharing group is constructed by a host 24-1 and the clients 26-1 to 26-3. A sharing group is constructed by a host 24-2 and clients 26-11 to 26-13. A sharing group is constructed by a host 24-3 and clients 26-21 to 26-23. The system form of FIG. 37 is characterized in that with respect to the hosts 24-1, 24-2, and 24-3 which function as a concentration type processing apparatus in the sharing groups, network paths 200-12, 200-23, and 200-13 are further provided, thereby making it possible to access from a certain host to another sharing group through another host.

Figure 38:
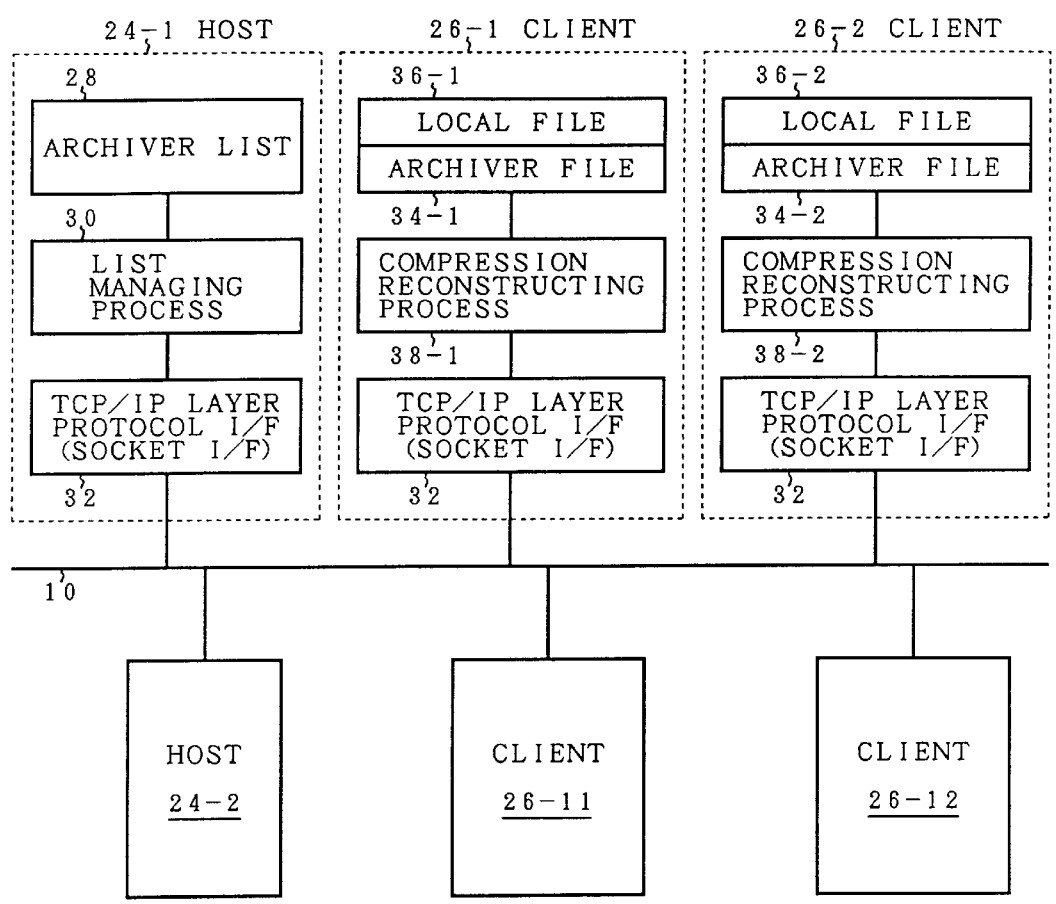
FIG. 38 is a block diagram of system functions to realize the expansion system in FIG. 37.

FIG. 38 is a functional block diagram on the host and client sides in the expanded system of FIG. 37 and shows an example constructed by the sharing group of the host 24-1 and clients 26-1 and 26-2 and the sharing group of the host 24-2 and clients 26-11 and 26-12 in FIG. 38. Although the hosts 24-1 and 24-2 and the clients 26-1, 26-2, 26-11, and 26-12 physically exist on the same network 10, different groups are constructed by the group setting of the set-up module 17 provided for the archiver module in FIG. 4. As a system form, as shown on the side of the host 24-1 and the clients 26-1 and 26-2, the same system form I as that of FIG. 7 is shown as an example and the same shall also apply to the other sharing group on the side of the host 24-2 and clients 26-11 and 26-12.

Figure 39:
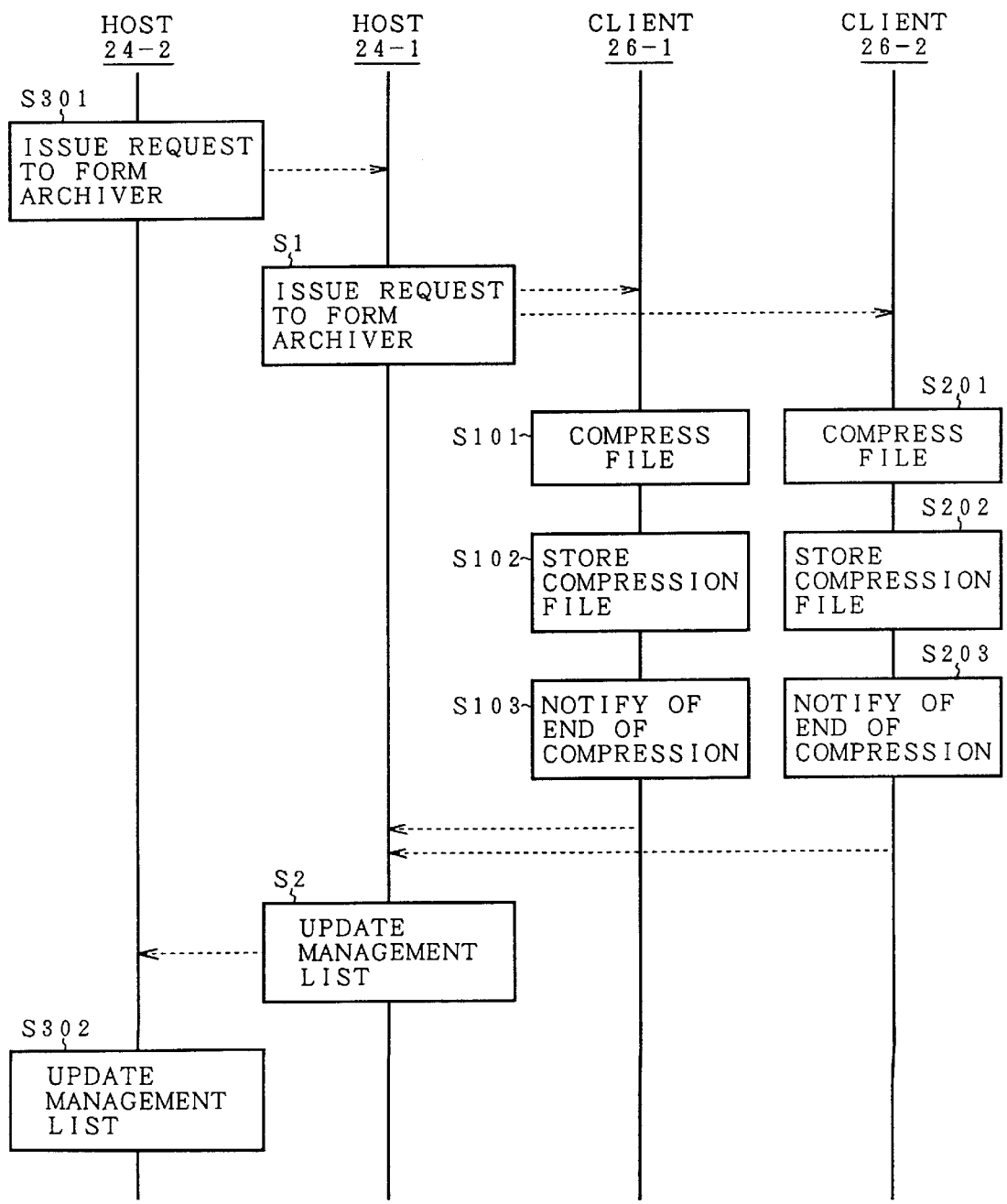
FIG. 39 is a time chart for an archiver forming process in the expansion system in FIG. 38.

FIG. 39 is a time chart for the archiver forming request in the expanded system of FIG. 38. It is now assumed that the formation of a data file such as a monthly report or the like is finished in each of the clients 26-11 and 26-12 of the sharing group on the host 24-2 side in FIG. 38 and an archiver forming request to store the data into the archiver files 34-1 and 34-2 arranged on the clients 26-1 and 26-2 side of another group is generated. Thus, the host 24-2 recognizes the archiver forming request and generates a data compressing command as an archiver forming request to the host 24-1 of another group in step S301. The host 24-1 which received the data compressing command generates a compressing command as an archiver forming request to the clients 26-1 and 26-2 belonging to the same group in step S1. On the other hand, the data files formed on the clients 26-11 and 26-12 side serving as compression targets are directly transferred from the client 26-11 to the client 26-1 or from the client 26-12 to the client 26-2 by a command from the host 24-2 without passing through the host 24-1. Therefore, in the clients 26-1 and 26-2, by receiving the compressing command from the host 24-1 and the transfer of the data files from the clients 26-11 and 26-12 of another group, the data files are compressed in steps S101 and S201. In steps S102 and S202, the compressed data files are stored into the own archiver data files 34-1 and 34-2. The end of compression is notified to the host 24-1 in steps S103 and S203. When receiving the compression end notification from the clients 26-1 and 26-2, the host 24-1 updates the archiver management list into the compressing state in step S2 and the compression end notification is notified to the host 24-2 of further another group. The host 24-2 of another group likewise updates the archiver management list into the compressing state in step S302. As mentioned above, in the expanded system of FIG. 38, when the group is different, the archiver of another group cannot be directly formed. However, the archiver forming process can be executed via each host in substantially the same manner. As for the data as a substance, it is directly transferred from the client of another group to the client to which the archiver has been distributed.

Figure 40:
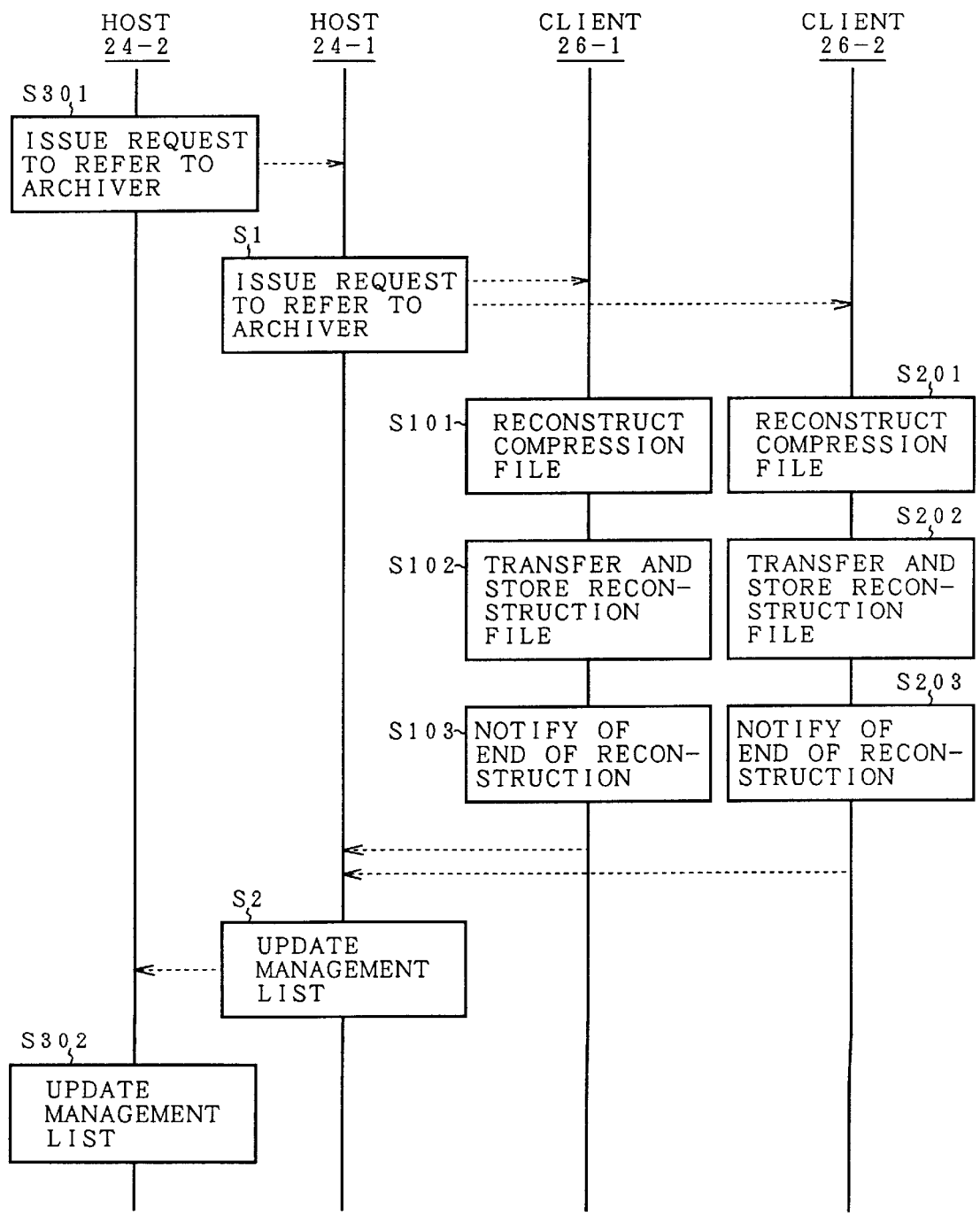
FIG. 40 is a time chart for an archiver referring process in the expansion system in FIG. 38.
Figure 41:
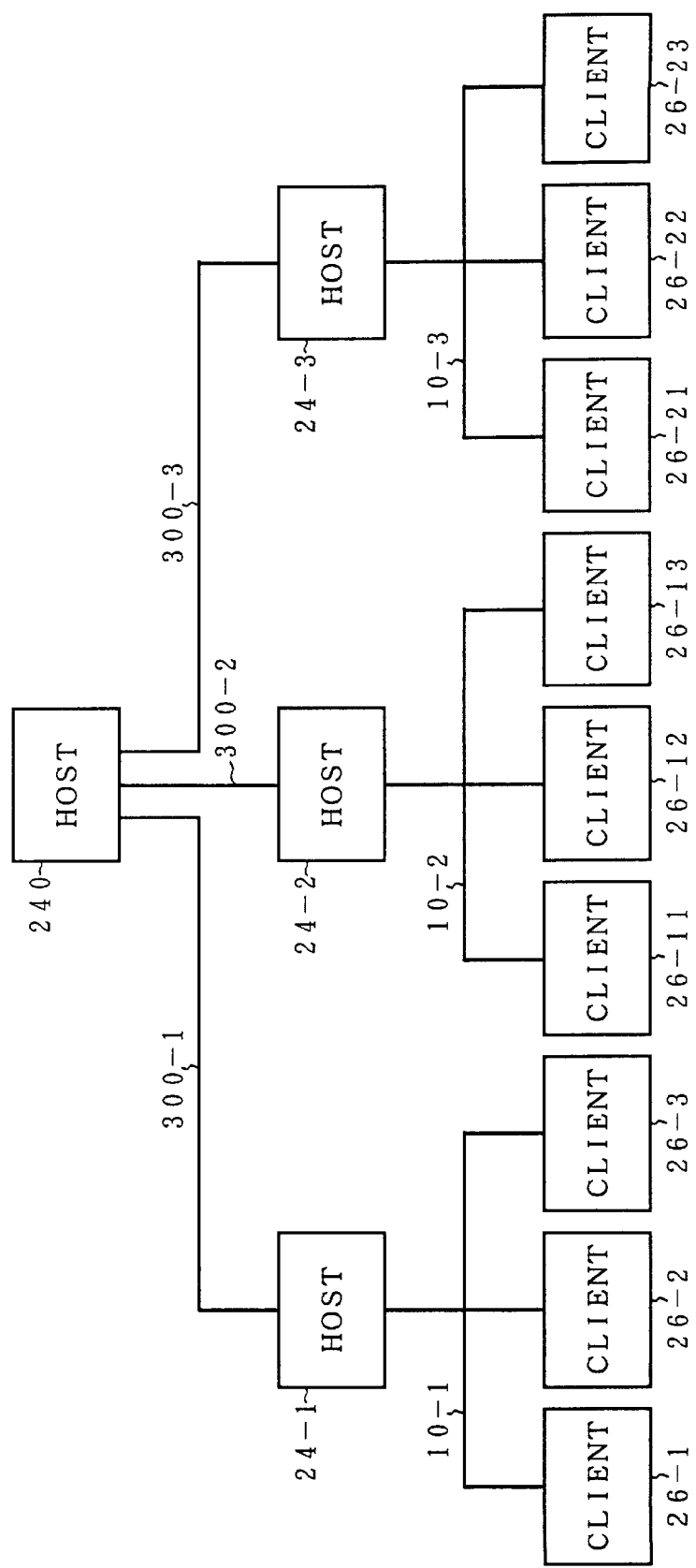
FIG. 41 is a block diagram of an expansion system in which a plurality of groups of hosts are connected to an upper integration host, thereby enabling an access exceeding the groups to be performed.

FIG. 40 is a time chart for the archiver referring process in the expanded system of FIG. 38. In the clients 26-11 and 26-12 belonging to the group of the host 24-2, when the referring operations of the data files stored in the archiver files 34-1 and 34-2 of the clients 26-1 and 26-2 of another group are now executed, the host 24-2 recognizes them and notifies the host 24-1 of the reconstructing command as an archiver referring request. In response to it, the host 24-1 generates a reconstructing command as an archiver referring request to the clients 26-1 and 26-2 of the same group in step S1. The clients 26-1 and 262 which received the reconstructing command read out the compressed data files requested from the own archiver files 34-1 and 34-2 in step S101 and reconstruct the compressed data files by the compression reconstructing processes 38-1 and 38-2. In steps S102 and S202, the reconstructed data files are transferred to the clients 26-11 and 26-12 of another group serving as a request source side and are also stored into the own archiver files 34-1 and 34-2. In steps S103 and S203, the end of reconstruction is notified to the host 24-1. By receiving the reconstruction end notification, the host 24-1 updates the archiver management list into the reconstructing state in step S2. Further, the reconstruction end notification is notified from the host 24-1 to the host 24-2 of another group. In step S302, the host 24-2 likewise updates the archiver management list into the reconstructing state. In the expanded system of FIG. 38, although the system form I has been shown and described as an example, the same construction shall also similarly apply to the system form II in FIG. 24 and the system form III in FIG. 31. FIG. 41 shows another embodiment of an expanded system of a network archiver system of the invention. Although the different hosts are mutually coupled by paths in the expanded system in FIG. 37, the expanded system of FIG. 41 is characterized in that a host computer 240 for a whole control is further provided as an upper apparatus of the host computers 24-1, 24-2, and 24-3 and the archiver processes of all of the groups belonging to the general host computer 240 under the domination thereof are managed in a lump. Therefore, each of the host computers 24-1 to 24-3 notifies the general host computer 240 of all of the archiver processing requests from the clients of the own group, thereby making it possible to reflect to the host computers of the other groups. The load on the hosts existing in each group can be reduced.

FIG. 42 shows another embodiment of an archiver network system of the invention. This embodiment is characterized in that a WWW server which is used in the Internet and a function of a WWW browser as its retrieval software are added to the system. That is, the computer apparatus 12-1 serving as an archiver process installation host in which an archiver module to realize the network archiver system of the invention shown in FIG. 3 has been installed and the computer apparatuses 12-2 and 12-3 serving as archiver process installation clients are connected to the network 10. In addition to the computer apparatuses 12-1 to 12-3, a WWW server 140 as an information transmission source of the Internet and WWW browser installation clients 150-1, 150-2, and 150-3 serving as retrieval machines are also connected to the network 10. The WWW server 140 is connected to the computer apparatus 12-1 serving as an archiver process installation host of the invention by an exclusive-use line and a communicating module for communicating an HTML on the WWW side with the host client side is installed. Therefore, by retrieving the WWW server 140 by the WWW browser installation clients of the computer apparatuses 150-1 to 150-3, the referring process for the archiver on the computer apparatuses 12-2 and 12-3 side serving as archiver process installation clients constructing the sharing group can be executed via the computer apparatus 12-1 serving as an archiver process installation host. As a WWW browser of the computer apparatuses 150-1 to 150-3, browser software such as a Netscope Navigator or the like can be used as it is. On the other hand, with respect to the archiver forming process, since the transfer of the data file from the WWW browser installation client side is accompanied, the same server function of the HTML data file as the WWW server 140 is necessary. When the server function on the WWW browser side as mentioned above is realized, by utilizing a method of down-loading a program and executing in accordance with a necessity from the network side represented by, for instance, JAVA, the archiver forming process from the WWW browser installation client side can be realized. In this case, although the file input from a local machine cannot be performed at present in terms of a security, such a problem will be solved in the near future.

According to the invention as mentioned above, a construction such that the data which has been distributed to many locations on the network and cannot be reused hitherto is used as sharing data while keeping the data distribution as it is can be realized. In the concentration management such as groupware or the like, there are limitations in the use and accumulation of the sharing data from the relation of loads on the network and server. In the invention, however, a data compressing technique is realized on the network and, with respect to the management of the archivers, a use form using the alias having no substance is constructed as archiver management information. By this method, an amount of data which is allowed to actually flow on the network is reduced. Further, the loads on the network and server are decreased. The accumulation amount of the sharing data is substantially increased. An easiness in use is improved. Thus, a use efficiency of the sharing data can be remarkably raised. Further, with regard to the arrangement of the archivers serving as compression, reconstruction, and storage destination sides of the data on the network, a proper system form in which the concentration type and the distribution type mixedly exist can be constructed. A flexible system according to the characteristics of the sharing data and the working contents using the sharing data can be constructed.

As sharing data to which the network archiver system of the invention is applied, it is not limited by applications such as groupware, process per data, transaction process, electronic mail, and the like. The construction and use of the archiver group can be freely realized by an Internet feeling for an arbitrary data file existing on the network as a target.

What is claimed is:

1. A network archiver system in which a sharing group which shares data by a plurality computer apparatuses connected through a network is formed and data files formed by each computer apparatus are stored as sharing data files into an archiver existing on said network, comprising:

an archiver forming module for compressing the data of the data file on said computer network and storing the compressed data file into said archiver when a request to form said archiver is received;

an archiver referring module for reading out the compressed data file from said archiver, reconstructing the compressed data file on said network, and storing the reconstructed file into said archiver when a request to refer to said archiver is received; and an archiver managing module for concentratedly managing said archiver on said network, wherein among said plurality of computer apparatuses constructing said sharing group, one specific computer apparatus is used as a concentration type processing apparatus, the remaining computer apparatuses are used as distribution type processing apparatuses, at least any one of four processes such as arrangement of said archivers, forming of the archivers by said archiver forming module, referring of archivers by said archiver referring module, and management of the archivers by said archiver managing module is allocated to said concentration type processing apparatus and is allowed to be independently processed by said apparatus, and wherein with respect to each of the remaining processes among said four processes, one process is divided and is allocated to said plurality of distribution type processing apparatuses and is allowed to be processed by said apparatuses, thereby allowing said archiver, said archiver forming module, and said archiver referring module to mixedly exist on the network.

2. A system according to claim 1, wherein:

said archiver managing module is concentratedly arranged in said concentration type processing apparatus and a compression or a reconstruction of the data file for said distribution type processing apparatuses is instructed; and said archiver forming module, said archiver referring module, and said archiver are distributed and arranged to each of said distribution type processing apparatuses, the compression or reconstruction of the data file by the command from said concentration type processing apparatus is executed, and the resultant data file is preserved.

3. A system according to claim 2, wherein:

when said concentration type processing apparatus receives the archiver forming request from itself or an arbitrary distribution type processing apparatus, said concentration type processing apparatus retrieves the distribution type processing apparatus having the archiver in which the relevant data file has been stored by a retrieval of archiver management information and generates a compressing command; and when said distribution type processing apparatus receives the compressing command from said concentration type processing apparatus, said distribution type processing apparatus reads out the relevant data file from the own archiver and compresses and, thereafter, stores the compressed data file, and notifies said concentration type processing apparatus of the end of said compression, thereby allowing said archiver management information to be updated into a compressing state.

4. A system according to claim 2, wherein:

when said concentration type processing apparatus receives the archiver referring request from itself or an arbitrary distribution type processing apparatus, said concentration type processing apparatus retrieves the distribution type processing apparatus having the archiver in which the relevant compressed data file has been stored by a retrieval of archiver management information and generates a reconstructing command; and when said distribution type processing apparatus receives the reconstructing command from said concentration type processing apparatus, said distribution type processing apparatus reads out the relevant compressed data file from the own archiver, reconstructs, and thereafter, stores the reconstructed data file, and notifies said concentration type processing apparatus of the end of said reconstruction, thereby allowing contents of said archiver management information to be updated into a reconstructing state.

5. A system according to claim 1, wherein:

said archiver managing module and the archiver are concentratedly arranged into said concentration type processing apparatus and a compression or a reconstruction of the data file is instructed to said distribution type processing apparatus; and said archiver forming module and said archiver referring module are distributed and arranged into each of said distribution type processing apparatuses, the data file is compressed or reconstructed by the command from said concentration type processing apparatus and, thereafter, the compressed or reconstructed data file is transferred to said concentration type processing apparatus and is allowed to be stored into the archiver.

6. A system according to claim 5, wherein:

when said concentration type processing apparatus receives the archiver forming request from itself or an arbitrary distribution type processing apparatus, said concentration type processing apparatus retrieves the distribution type processing apparatus for compressing the relevant data file from archiver management information, generates a compressing command, reads out the relevant data file from the own archiver, and transfers to said distribution type processing apparatus; and when said distribution type processing apparatus receives the compressing command from said concentration type processing apparatus, said distribution type processing apparatus compresses the data file transferred from said concentration type processing apparatus and, thereafter, transfers the compressed data file to said concentration type processing apparatus and is allowed to be stored into the archiver, and further, notifies said concentration type processing apparatus of the end of said compression, thereby allowing said archiver management information to be updated into a compressing state.

7. A system according to claim 6, wherein said distribution type processing apparatus transfers the compressed data file to said concentration type processing apparatus and allows the compressed data file to be preserved and simultaneously preserves said data file as a backup file by itself.

8. A system according to claim 5, wherein:

when said concentration type processing apparatus receives the archiver referring request from itself or an arbitrary distribution type processing apparatus, said concentration type processing apparatus retrieves the distribution type processing apparatus for reconstructing the relevant data file from archiver management information, generates a reconstructing command, reads out the relevant compressed data file from the own archiver, and transfers to said distribution type processing apparatus; and when said distribution type processing apparatus receives the reconstructing command from said concentration type processing apparatus, said distribution type processing apparatus reconstructs the compressed data file transferred from said concentration type processing apparatus and, thereafter, transfers the reconstructed data file to said concentration type processing apparatus and allows the reconstructed data file to be stored into the archiver, and further, notifies said concentration type processing apparatus of the end of said reconstruction, thereby allowing said archiver management information to be updated into a reconstructing state.

9. A system according to claim 8, wherein said distribution type processing apparatus transfers the reconstructed data file to said concentration type processing apparatus and allows the reconstructed data file to be preserved and simultaneously preserves said data file as a backup file by itself.

10. A system according to claim 1, wherein:

said archiver managing module, said archiver forming module, and said archiver referring module are respectively concentratedly arranged into said concentration type processing apparatus and a compression and a reconstruction of the data file for said archiver are concentratedly processed, and said archiver is distributed and arranged to each of said distribution type processing apparatuses, the data file transferred from said concentration type processing apparatus is compressed and stored and reconstructed, and the reconstructed data file is transferred.

11. A system according to claim 10, wherein:

when said concentration type processing apparatus receives the archiver forming request from itself or an arbitrary distribution type processing apparatus, said concentration type processing apparatus retrieves the distribution type processing apparatus having the archiver in which the relevant data file has been stored from archiver management information and generates a transfer command;

when said distribution type processing apparatus receives the transfer command from said concentration type processing apparatus, said distribution type processing apparatus reads out the relevant data file from the own archiver and transfers the read-out data file to said concentration type processing apparatus and allows the transferred data file to be compressed; and further, after said concentration type processing apparatus compressed the data file transferred from said distribution type processing apparatus, said concentration type processing apparatus transfers the compressed data file to said distribution type processing apparatus and allows said transferred data file to be stored and allows the archiver management information to be updated into a compressing state.

12. A system according to claim 10, wherein:

when said concentration type processing apparatus receives the archiver referring request from itself or an arbitrary distribution type processing apparatus, said concentration type processing apparatus retrieves the distribution type processing apparatus having the archiver in which the relevant compressed data file has been stored from archiver management information and generates a transfer command;

when said distribution type processing apparatus receives the transfer command from said concentration type processing apparatus, said distribution type processing apparatus reads out the relevant compressed data file from the own archiver and transfers the read-out data file to said concentration type processing apparatus; and further, after said concentration type processing apparatus reconstructed the compressed data file transferred from said distribution type processing apparatus, said concentration type processing apparatus transfers the reconstructed data file to said distribution type processing apparatus and allows said transferred data file to be stored into the archiver and allows the archiver management information to be updated into a reconstructing state.

13. A system according to claim 1, wherein a plurality of groups each having said concentration type processing apparatus and said plurality of distribution type processing apparatuses are provided, and said concentration type processing apparatus of each of said plurality of groups requests a formation and a reference of said archiver to the concentration type processing apparatuses of the other groups.

14. A system according to claim 1, wherein a plurality of groups each having said concentration type processing apparatus and said plurality of distribution type processing apparatuses are provided, a general concentration type processing apparatus is further arranged as an upper apparatus of said concentration type processing apparatus of each of said plurality of groups, and a formation and a reference of said archiver are requested among said plurality of groups.

15. A system according to claim 1, wherein said archiver managing module manages a preserving position of the archiver, the presence or absence of a compression, a date of formation, a size, a file name, a directory name, a computer name, and the presence or absence of a compressing state as archiver management information.

16. A system according to claim 1, wherein archiver management information by said archiver managing module can be transparently referred as same contents from any one of the computer apparatuses on said network.

17. A system according to claim 1, wherein said archiver managing module forms link information as hierarchical archiver management information indicative of an addition of personal information into an archiver file and manages the archiver file using the link information.

18. A system according to claim 17, wherein when the archivers of a plurality of groups are managed, said archiver managing module includes archiver management information of the other groups into hierarchical archiver management information of each of said plurality of groups and manages the archiver file using the hierarchical archiver management information.

19. A storage medium in which a program to construct a network archiver system such that a sharing group which shares data by a plurality of computer apparatuses connected through a network is formed and data files formed by said computer apparatuses are stored as sharing data files into an archiver existing on the network, comprising:

an archiver forming module for compressing the data of the data file on said computer network and storing the compressed data file into said archiver when a request to form said archiver is received;

an archiver referring module for reading out the compressed data file from said archiver, reconstructing the compressed data file on said network, and storing the reconstructed data file into said archiver when a request to refer to said archiver is received; and an archiver managing module for concentratedly managing said archiver on said network, wherein among said plurality of computer apparatuses constructing said sharing group, one specific computer apparatus is used as a concentration type processing apparatus, the remaining computer apparatuses are used as distribution type processing apparatuses, at least any one of four processes such as arrangement of said archivers, forming of the archivers by said archiver forming module, reference of the archivers by said archiver referring module, and management of the archivers by said archiver managing module is allocated to said concentration type processing apparatus and is allowed to be independently Processed by said apparatus, and wherein with respect to each of the remaining processes among said four processes, one process is divided and is allocated to said plurality of distribution type processing apparatuses and is allowed to be processed by said apparatuses, thereby allowing said archiver, said archiver forming module, and said archiver referring module to mixedly exist on the network.

20. A network archiver system in which a sharing group which shares data by a plurality of computer apparatuses connected through a network is formed and data files formed by each computer apparatus are stored as sharing data files into an archiver existing on said network, comprising:

an archiver forming module for compressing the data of the data file on said computer network and storing the compressed data file into said archiver when a request to form said archiver is received;

an archiver referring module for reading out the compressed data file from said archiver, reconstructing the compressed data file on said network, and storing the reconstructed file into said archiver when a request to refer to said archiver is received; and an archiver managing module for forming and managing archiver management information to concentratedly manage archivers on said network, for forming a catalog list describing at least file names and machine names showing preserving positions as said archiver management information on a file unit basis, for transferring said archiver management information on the basis of a request from a computer apparatus to form said shared group, and for displaying said catalog list, wherein among said plurality of computer apparatuses constructing said sharing group, one specific computer apparatus is used as a concentration type processing apparatus, the remaining computer apparatuses are used as distribution type processing apparatuses, at least any one of four processes such as arrangement of said archivers, forming of the archivers by said archiver forming module, referring of archivers by said archiver referring module, and management of the archivers by said archiver managing module is allocated to said concentration type processing apparatus and is allowed to be independently processed by said apparatus, wherein with respect to each of the remaining processes among said four processes, one process is divided and is allocated to said plurality of distribution type processing apparatuses and is allowed to be processed by said apparatuses, thereby allowing said archiver, said archiver forming module, and said archiver referring module to mixedly exist on the network.

21. A system according to claim 20, wherein said archiver managing module forms a network connection situation describing the machine names which forms said sharing group as said archiver management information and allows said network connection situation to be displayed together with said catalog list by said computer apparatus forming said sharing group.

22. A system according to claim 20, wherein said archiver managing module further describes a directory name, a size, a date of forming, and, further, the presence or absence of a compression ratio into said catalog list and allows said catalog list to be displayed by the computer apparatus on a requesting source side which forms said sharing group.

23. A system according to claim 20, in the case where the catalog list of said archiver files is set to a first hierarchical catalog list, said archiver managing module adds link information showing the presence of personal information files which were hierarchically added to said archiver files of said first hierarchical catalog list, forms a second hierarchical catalog list showing said personal information files corresponding to said link information, and manages it.

24. A system according to claim 22, wherein said second hierarchical catalog list describes a file name, a machine name showing a preserving position, a directory name, a size, a date of forming, and further, the presence or absence of a compression ratio and is displayed by the computer apparatus on a requesting source side by an operation of the link information on said first hierarchical catalog list.

25. A system according to claim 17, wherein when the archivers of a plurality of groups are managed, said archiver managing module includes catalog lists of the other groups to the catalog list of each group and forms a catalog list and allows said catalog list to be displayed by the computer apparatus on a requesting source side included in said plurality of groups.

26. A storage medium in which a program to construct a network archiver system such that a sharing group which shares data by a plurality of computer apparatuses connected through a network is formed and data files formed by said computer apparatuses are stored as sharing data files into an archiver existing on the network has been store, comprising:

an archiver forming module for compressing the data of the file on said computer network and storing the compressed data file into said archiver when a request to form said archiver is received;

an archiver referring module for reading out the compressed data file from said archiver, reconstructing the compressed data file on said network, and storing the reconstructed date file into said archiver when a request to refer to said archiver is received; and an archiver managing module for forming and managing archiver management information to concentratedly manage archivers on said network, for forming a catalog list describing at least file names and machine names showing preserving positions as said archiver management information on a file unit basis, for transferring said archiver management information on the basis of a request from a computer apparatus to form said shared group, and for displaying said catalog list, wherein among said plurality of computer apparatuses constructing said sharing group, one specific computer apparatus is used as a concentration type processing apparatus, the remaining computer apparatuses are used as distribution type processing apparatuses, at least any one of four processes such as arrangement of said archivers, forming of the archivers by said archiver forming module, reference of the archivers, by said archiver managing module is allocated said concentration type processing apparatus and is allowed to be independently processed by said apparatus, and wherein with respect to each of the remaining processes among said four processes, one process is divided and Is allocated to said plurality of distribution type processing apparatuses and is allowed to be processed by said apparatuses, thereby allowing said archiver, said archiver forming module, and said archiver referring module to mixedly exist on the network.

* * * * *